US010428726B2

(12) United States Patent
Uto et al.

(10) Patent No.: US 10,428,726 B2
(45) Date of Patent: Oct. 1, 2019

(54) CONTROL APPARATUS FOR INTERNAL COMBUSTION ENGINE

(71) Applicant: HONDA MOTOR CO., LTD., Tokyo (JP)

(72) Inventors: Hajime Uto, Wako (JP); Yosuke Yamada, Wako (JP); Noritaka Kimura, Wako (JP); Takayoshi Nakamura, Wako (JP); Kosuke Ihara, Wako (JP); Yoshinori Matsuo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 15/552,554

(22) PCT Filed: Jan. 8, 2016

(86) PCT No.: PCT/JP2016/050445
§ 371 (c)(1),
(2) Date: Aug. 22, 2017

(87) PCT Pub. No.: WO2016/136291
PCT Pub. Date: Sep. 1, 2016

(65) Prior Publication Data
US 2018/0334951 A1 Nov. 22, 2018

(30) Foreign Application Priority Data

Feb. 26, 2015 (JP) .................................. 2015-036409
Mar. 2, 2015 (JP) .................................. 2015-040312

(51) Int. Cl.
*F02B 29/04* (2006.01)
*F02B 37/00* (2006.01)
(Continued)

(52) U.S. Cl.
CPC ............. *F02B 29/04* (2013.01); *F02M 25/08* (2013.01); *F02M 26/06* (2016.02); *F02M 26/22* (2016.02);
(Continued)

(58) Field of Classification Search
CPC .. F02B 29/04; F02B 29/0406; F02B 29/0437; F02B 29/0493; F01P 3/12; F01P 3/20; F01P 1/00
See application file for complete search history.

(56) References Cited

U.S. PATENT DOCUMENTS

2001/0045103 A1* 11/2001 Khelifa .................. B60H 1/143
62/244
2013/0276765 A1* 10/2013 Moffat ................ F02B 29/0437
123/568.12
(Continued)

FOREIGN PATENT DOCUMENTS

GB     2099981 A  * 12/1982  ................ F01P 3/20
JP     4269772 B2   5/2009
(Continued)

OTHER PUBLICATIONS

International Search Report dated Apr. 5, 2016, issued in counterpart application No. PCT/JP2016/050445, w/English translation. (7 pages).

*Primary Examiner* — Jason D Shanske
*Assistant Examiner* — Jessica L Kebea
(74) *Attorney, Agent, or Firm* — Westerman, Hattori, Daniels & Adrian, LLP

(57) ABSTRACT

A control apparatus 1 for the engine includes an ECU. When the operating region of the engine is in the EGR execution region B, the ECU performs the EGR control (step 2), and performs first coolant temperature control for controlling an IC coolant temperature TWic such that the temperature of intake air passing through an intercooler exceeds a dew-
(Continued)

point temperature (step 14). Further, in a case where the operating region of the engine is in the EGR stop region C, the ECU performs second coolant temperature control for controlling the IC coolant temperature TWic such that the temperature of intake air having passed through the intercooler exceeds the dew-point temperature, assuming that the operating region of the engine has shifted to the EGR execution region B (step 17).

4 Claims, 7 Drawing Sheets

(51) Int. Cl.
*F02M 26/22* (2016.01)
*F02M 25/08* (2006.01)
*F02M 26/06* (2016.01)

(52) U.S. Cl.
CPC ............. *F02B 37/00* (2013.01); *Y02T 10/144* (2013.01); *Y02T 10/146* (2013.01)

(56) References Cited

U.S. PATENT DOCUMENTS

| | | | | |
|---|---|---|---|---|
| 2014/0150755 | A1* | 6/2014 | Cunningham | F02B 29/0493 |
| | | | | 123/563 |
| 2015/0152817 | A1* | 6/2015 | Roth | F02M 31/042 |
| | | | | 123/435 |
| 2015/0369179 | A1* | 12/2015 | Hotta | F02D 41/0065 |
| | | | | 123/568.12 |
| 2019/0162110 | A1* | 5/2019 | Manju | F02M 26/17 |

FOREIGN PATENT DOCUMENTS

| | | | | |
|---|---|---|---|---|
| JP | 2012-219687 A | | 11/2012 | |
| JP | 2014-1703 A | | 1/2014 | |
| JP | 2014-156804 A | | 8/2014 | |
| JP | 2015094291 A | * | 5/2015 | ......... F02D 41/0065 |
| WO | WO-2017090548 A1 | * | 6/2017 | ................ F01P 3/20 |

* cited by examiner

CONTROL APPARATUS FOR INTERNAL COMBUSTION ENGINE

TECHNICAL FIELD

The present invention relates to a control apparatus for an internal combustion engine that includes a supercharging device, an EGR device, and an intake air cooling device.

BACKGROUND ART

Conventionally, as a control apparatus for an internal combustion engine, there has been known one disclosed in PTL 1. This engine is provided with a supercharging device, an EGR device, and a water-cooled intercooler as an intake air cooling device. In the engine, to enhance charging efficiency, a supercharging operation is performed by the supercharging device, and intake air increased in temperature by the supercharging operation is cooled by the intercooler. Further, an intercooler cooling circuit is connected to the intercooler. The intercooler cooling circuit is provided with an electric pump for circulating coolant through the circuit, and a flow passage of an engine cooling circuit is connected to the intercooler cooling circuit. The engine cooling circuit is provided with three electric valves, and is configured such that coolant having a relatively high temperature from the engine cooling circuit (hereinafter referred to as the "engine coolant") is introduced into the intercooler cooling circuit or the introduction of the engine coolant is stopped, according to open/closed states of the electric valves.

In the control apparatus, EGR control for recirculating part of exhaust gases from an exhaust passage into an intake passage is performed via the EGR device. Further, during execution of the EGR control, to prevent condensed water from being generated when intake air passes through the intercooler, an outlet temperature of the intercooler is controlled by a control method shown in FIG. 2 of PTL 1. That is, when the outlet temperature of the intercooler is not higher than a dew-point temperature as a generation temperature of condensed water, the engine coolant is introduced into the intercooler cooling circuit, whereby the outlet temperature of the intercooler is controlled such that it is higher than the dew-point temperature. On the other hand, during stop of the EGR control, the outlet temperature of the intercooler is controlled to a temperature lower than during execution of the EGR control due to a decrease in the dew-point temperature (PTL 1 (Paragraph number [0097], FIG. 7)).

Further, as another control apparatus, there has been known one disclosed e.g. in PTL 2. This control apparatus is applied to an engine equipped with an engine cooling circuit and an intercooler cooling circuit having respective arrangements similar to those in PTL 1. During low-load operation of the engine, the engine cooling circuit and the intercooler cooling circuit are shut off from each other, and an electric pump is controlled such that a detected temperature of cooling liquid flowing into an intercooler (hereinafter referred to as the "IC inflow cooling liquid temperature") becomes equal to a target temperature. The target temperature is set to such a value as will make it possible to suppress the temperature of intake air during acceleration to thereby obtain excellent acceleration performance. From the above, the conventional control apparatus disclosed in PTL 2 is configured such that excellent acceleration performance is obtained when the engine shifts from low-load operation to high-load operation.

CITATION LIST

Patent Literature

[PTL 1] Japanese Laid-Open Patent Publication (Kokai) No. 2014-156804

[PTL 2] Publication of Japanese Patent No. 4269772

SUMMARY OF INVENTION

Technical Problem

According to the above-described control apparatus disclosed in PTL 1, during stop of the EGR control, the outlet temperature of the intercooler is controlled to a temperature lower than during execution of the EGR control, and hence when an operating region of the engine has shifted from an EGR stop region where the EGR control should be stopped to an EGR execution region where the EGR control should be executed, the following problem can occur: In the case of the method of increasing the outlet temperature of the intercooler by introducing the engine coolant as in PTL 1, due to the principle of the method, it takes time before the outlet temperature of the intercooler is increased after introduction of the engine coolant. As a consequence, although the operating region of the engine is in the EGR execution region, a state in which the EGR control cannot be performed is continued for a long time period, which leads to degradation of fuel economy.

Further, in the case of the control apparatus disclosed in PTL 1, when the outlet temperature of the intercooler is not higher than the dew-point temperature, the engine coolant is introduced into the intercooler cooling circuit. However, the outlet temperature of the intercooler is a temperature of intake air on a downstream side of the intercooler, that is, an average temperature of intake air obtained by averaging cooling influences of the intercooler, and therefore the temperature of intake air sometimes becomes locally lower than the dew-point temperature in the intercooler. In this case, it is impossible to properly suppress generation of condensed water.

Further, in the conventional control apparatus disclosed in PTL 2, during low-load operation of the engine, the engine cooling circuit and an intake air temperature-adjusting circuit are shut off from each other, and the IC inflow cooling liquid temperature is controlled such that it becomes equal to the target temperature. Therefore, the temperature of intake air sometimes becomes lower than the dew-point temperature in the vicinity of the outlet of the intercooler. In this case, it is impossible to properly suppress generation of condensed water.

The present invention has been made to provide a solution to the above-described problems, and an object thereof is to provide a control apparatus for an internal combustion engine, which, in the case of the engine being equipped with a supercharging device, an EGR device, and an intake air cooling device, when an operating region of the engine has shifted from an EGR stop region to an EGR execution region, is capable of quickly starting EGR control while preventing condensed water from being generated in intake air, thereby making it possible to ensure excellent fuel economy. Another object thereof is to provide a control apparatus for the internal combustion engine, which is capable of properly control the adjustment of a temperature of intake air, i.e. intake gases by an intercooler, thereby making it possible to properly suppress generation of condensed water in the intercooler.

Solution to Problem

To attain the above former object, the invention according to claim 1 is a control apparatus 1 for an internal combustion engine 3 that includes a supercharging device (turbocharger 10) for pressurizing intake air in an intake passage 4, a first cooling device (intake air cooling device 30) for cooling intake air flowing through a predetermined portion of the intake passage 4 at a location downstream of the supercharging device, by using coolant circulating through a first radiator (sub radiator 31) and a first cooling circuit, a temperature-increasing device 50 for increasing a temperature of the coolant in the first cooling circuit, and an EGR device 60 for recirculating part of exhaust gases in an exhaust passage 7 to an upstream side of the predetermined portion of the intake passage 4, the control apparatus 1 comprising operating region-determining means (ECU 2, steps 1, 12, 15) for determining in which of an EGR execution region B where recirculation of exhaust gases by the EGR device 60 should be performed, and an EGR stop region A, C, D where the recirculation of exhaust gases by the EGR device 60 should be stopped, an operating region of the engine 3 is, EGR control means (ECU 2, step 2) for performing, based on a result of determination by the operating region-determining means, EGR control for controlling an amount of exhaust gases recirculated into the intake passage 4 via the EGR device 60, when the operating region of the engine 3 is in the EGR execution region B, first coolant temperature control means (ECU 2, step 14) for performing, based on the result of the determination by the operating region-determining means, when the operating region of the engine 3 is in the EGR execution region B, first coolant temperature control for controlling the temperature (IC coolant temperature TWic) of the coolant in the first cooling circuit via the temperature-increasing device 50 such that a temperature of intake air having passed through the predetermined portion of the intake passage 4 exceeds a dew-point temperature, and second coolant temperature control means (ECU 2, step 17) for performing, based on the result of the determination by the operating region-determining means, in a case where the operating region of the engine 3 is in the EGR stop region C, second coolant temperature control for controlling the temperature (IC coolant temperature TWic) of the coolant in the first cooling circuit via the temperature-increasing device 50 such that the temperature of the intake air having passed through the predetermined portion of the intake passage 4 exceeds the dew-point temperature, assuming that the operating region of the engine 3 has shifted to the EGR execution region B.

According to this control apparatus for an internal combustion engine, it is determined which of the EGR execution region where recirculation of exhaust gases by the EGR device should be performed, and the EGR stop region where the recirculation of exhaust gases by the EGR device should be stopped, the operating region of the engine is in. When the operating region of the engine is in the EGR execution region, the amount of exhaust gases recirculated into the intake passage via the EGR device is controlled. In a case where the EGR control is thus performed, the gases recirculated by the EGR device are introduced into the upstream side of the predetermined portion of the intake passage, so that when intake air having the recirculated gases mixed therein passes through the predetermined portion, the intake air is cooled by the first cooling device, and when the temperature of the intake air becomes equal to or lower than the dew-point temperature, there is a possibility of generation of condensed water.

According to the above control apparatus, however, when the operating region of the engine is in the EGR execution region, the first coolant temperature control for controlling the temperature of the coolant in the first cooling circuit via the temperature-increasing device is performed such that the temperature of the intake air having passed through the predetermined portion of the intake passage exceeds the dew-point temperature, and hence during execution of the EGR control, it is possible to prevent condensed water from being generated in the intake air. Further, in the case where the operating region of the engine is in the EGR stop region, the second coolant temperature control for controlling the temperature of the coolant in the first cooling circuit via the temperature-increasing device is performed such that the temperature of the intake air having passed through the predetermined portion of the intake passage exceeds the dew-point temperature, assuming that the operating region of the engine has shifted to the EGR execution region. Therefore, even during stop of the EGR control, it is possible to prevent condensed water from being generated in the intake air, and when the operating region of the engine has shifted from the EGR stop region to the EGR execution region, it is possible to quickly start the EGR control while preventing condensed water from being generated in the intake air. This makes it possible to ensure excellent fuel economy, thereby making it possible to enhance marketability.

The invention according to claim 2 is the control apparatus 1 according to claim 1, wherein the engine 3 further includes a second cooling device (ENG cooling device 40) for cooling an engine body 3b by coolant circulating through a second radiator (main radiator 41) and a second cooling circuit, and wherein the temperature-increasing device 50 is configured to increase the temperature of the coolant in the first cooling circuit by introducing the coolant in the second cooling device into the first cooling circuit of the first cooling device (intake air cooling device 30.

Recent internal combustion engines are generally of water-cooled type in which an engine body is cooled by coolant. According to this control apparatus, however, the temperature-increasing device is configured to increase the temperature of the coolant in the first cooling circuit by introducing the coolant in the second cooling device into the first cooling circuit of the first cooling device, and hence by making use of a cooling device originally provided in a water-cooled engine, it is possible to realize a temperature-increasing device while suppressing an increase in the number of component parts. This makes it possible to further enhance marketability.

The invention according to claim 3 is the control apparatus 1 according to claim 1 or 2, wherein the EGR stop region A, C, D is set to include a second coolant temperature control execution region C where the second coolant temperature control is performed by the second coolant temperature control means, and a coolant temperature control stop region A, D where the first coolant temperature control and the second coolant temperature control should be stopped, wherein the second coolant temperature control execution region C is set to include operating regions on a lower load side and a higher load side than the EGR execution region B, and an operating region on a higher engine speed side than the EGR execution region B, and wherein the coolant temperature control stop region A, D is set to include a first stop region A on a lower load side and a lower engine speed side than the second coolant temperature control execution region C, and a second stop region D on a higher load side and a higher engine speed side than the second coolant temperature control execution region C, the control apparatus further comprising coolant temperature control stop means (ECU 2, step 18) for stopping the first coolant temperature control and the second coolant temperature control, when the operating region of the engine 3 is in the coolant temperature control stop region A, D.

According to this control apparatus, the EGR stop region is set to include the second coolant temperature control execution region where the second coolant temperature control is performed by the second coolant temperature control means, and the coolant temperature control stop region where the first coolant temperature control and the second coolant temperature control should be stopped. Since the second coolant temperature control execution region is set to include the operating regions on the lower load side and the higher load side than the EGR execution region, and the operating region on the higher engine speed side than the EGR execution region, it is possible to properly stop the EGR control in operating regions, such as a high-load region, a high-engine speed region and a low-load region, in which when execution of the EGR control may cause degradation of an operating state of the engine and reduction of output thereof. Further, when the operating region of the engine is in the coolant temperature control stop region, the first coolant temperature control and the second coolant temperature control are stopped. The coolant temperature control stop region is set to include the first stop region on the lower load side and the lower engine speed side than the second coolant temperature control execution region, and the second stop region on the higher load side and the higher engine speed side than the second coolant temperature control execution region. In this case, in a water-cooled engine, as in the case of the invention according to claim 2, when the operating region of the engine is in a region on a very low-load side and a very low-engine speed side, if the coolant temperature control is performed by introducing the coolant in the second cooling circuit into the first cooling circuit, the temperature of the engine itself is lowered, which can result in degradation of fuel economy and heater performance. Therefore, by setting the first stop region as such a region on the very low-load side and the very low-engine speed side, it is possible to avoid the degradation of fuel economy and heater performance. Further, in a case where the operating region of the engine is in an operating region on a very high-load side and a very high-engine speed side, intake air is brought into a state in which condensed water is difficult to be generated, whereby it becomes unnecessary to perform the coolant temperature control, and in a case where the coolant temperature control is continued, the temperature of the coolant circulating through the first cooling circuit continues to rise, which can cause reduction of cooling efficiency and degradation of fuel economy. Therefore, by setting the second stop region as such a region on the very high-load side and the very high-engine speed side, it is possible to avoid degradation of fuel economy and reduction of cooling efficiency.

To attain the above latter object, the invention according to claim 4 is a control apparatus for an internal combustion engine 3 including a supercharging device (turbocharger 10) provided in an intake passage 4 of the engine 3, for supercharging intake gases drawn into the engine 3, an intake gas temperature-adjusting circuit 30 including an intercooler 32 that is provided in the intake passage 4 at a location downstream of the supercharging device, for adjusting a temperature of intake gases by heat exchange between intake gas temperature-adjusting liquid flowing through the intercooler 32 and the intake gases, and a sub radiator 31 that is connected to the intercooler via a sub passage (IC temperature-adjusting liquid passage 33 in the embodiment (hereinafter, the same applies throughout this section)) for circulating the intake gas temperature-adjusting liquid, for cooling the intake gas temperature-adjusting liquid, and an EGR device 60 for recirculating part of exhaust gases from the engine 3 to an upstream side of the intercooler 32 in the intake passage 4, the control apparatus comprising upstream-side liquid temperature-acquiring means (upstream-side coolant temperature sensor 80) for acquiring an upstream-side liquid temperature, which is a temperature of the intake gas temperature-adjusting liquid on the upstream side of the intercooler 32 in the sub passage, downstream-side liquid temperature-acquiring means (downstream-side coolant temperature sensor 81) for acquiring a downstream-side liquid temperature, which is a temperature of the intake gas temperature-adjusting liquid on a downstream side of the intercooler 32 in the sub passage, a temperature-increasing device 50 for increasing the temperature of the intake gas temperature-adjusting liquid, target temperature-calculating means (ECU 2, step 22) for calculating a target temperature TWCMD of the intake gas temperature-adjusting liquid such that a temperature of intake gases on the downstream side of the intercooler 32 becomes higher than a dew-point temperature of the intake gases, and control means (ECU 2, steps 26 and 28) for performing a first control operation for controlling the temperature-increasing device 50 such that the acquired downstream-side liquid temperature (downstream-side low-temperature system coolant temperature TWDS) becomes equal to the calculated target temperature TWCMD when the intake gases are increased in temperature by the intercooler 32 (YES to the step 25), and performing a second control operation for controlling the temperature-increasing device 50 such that the acquired upstream-side liquid temperature (upstream-side low-temperature system coolant temperature TWUS) becomes equal to the target temperature TWCMD when the intake gases are cooled by the intercooler (YES to the step 27).

According to this control apparatus, in the intake gas temperature-adjusting circuit, the intake gas temperature-adjusting liquid circulates between the intercooler provided in the intake passage of the engine and the sub radiator via the sub passage. Further, the supercharging device is provided in the intake passage at a location upstream of the intercooler, and intake gases flowing into the intercooler are increased in temperature by being supercharged by the supercharging device. The intake gases having flowed into the intercooler are subjected to heat exchange with the intake gas temperature-adjusting liquid in the intercooler, whereby the temperature of the intake gases is adjusted. Furthermore, part of exhaust gases of the engine are recirculated to the upstream side of the intercooler in the intake passage by the EGR device (hereinafter the recirculated exhaust gases are referred to as the "EGR gases"). With this, intake gases including the EGR gases with a relatively large amount of water vapor flow into the intercooler.

Further, the upstream-side liquid temperature, which is the temperature of the intake gas temperature-adjusting liquid on the upstream side of the intercooler in above-mentioned sub passage, is acquired by the upstream-side liquid temperature-acquiring means, and the downstream-side liquid temperature, which is the temperature of the intake gas temperature-adjusting liquid on the downstream side of the intercooler in the sub passage, is acquired by the downstream-side liquid temperature-acquiring means. Furthermore, the intake gas temperature-adjusting liquid is increased in temperature by the temperature-increasing device.

Further, the target temperature of the intake gas temperature-adjusting liquid is calculated by the target temperature-calculating means such that the temperature of the intake gases on the downstream side of the intercooler becomes higher than the dew-point temperature of the intake gases, and when the intake gases are increased in temperature by the intercooler, the temperature-increasing device is controlled by the control means such that the acquired downstream-side liquid temperature becomes equal to the calculated target temperature, whereas when the intake gases are cooled by the intercooler, the temperature-increasing device is controlled by the control means such that the acquired upstream-side liquid temperature becomes equal to the target temperature.

When the intake gases are increased in temperature by the intercooler, heat of the intake gas temperature-adjusting liquid is taken away by the intake gases in the intercooler, whereby the downstream-side liquid temperature (temperature of the intake gas temperature-adjusting liquid on the downstream side of the intercooler) becomes lower than the upstream-side liquid temperature (temperature of the intake gas temperature-adjusting liquid on the upstream side of the intercooler). As described above, according to the present invention, when the intake gases are increased in temperature by the intercooler, differently from the above-described conventional control apparatus disclosed in PTL 2, the first control operation for controlling the temperature-increasing device such that the downstream-side liquid temperature becomes equal to the target temperature is performed, and hence the intake gases can be properly increased in temperature by the whole of the intercooler from inlet to outlet thereof such that the temperature of the intake gases exceeds the dew-point temperature thereof, whereby it is possible to properly suppress generation of condensed water in the intercooler.

Further, when the intake gases are cooled by the intercooler, the heat of the intake gases is added to the intake gas temperature-adjusting liquid in the intercooler, whereby the downstream-side liquid temperature becomes higher than the upstream-side liquid temperature. As described above, according to the present invention, when the intake gases are cooled in temperature by the intercooler, the second control operation for controlling the temperature-increasing device such that the upstream-side liquid temperature becomes equal to the target temperature is performed, and hence the intake gases can be properly cooled by the whole of the intercooler from inlet to outlet thereof such that the temperature of the intake gases becomes not lower than the dew-point temperature thereof, whereby it is possible to properly suppress generation of condensed water in the intercooler. From the above, according to the present invention, the adjustment of the temperature of intake gases by the intercooler can be properly controlled, whereby it is possible to properly suppress generation of condensed water in the intercooler.

The invention according to claim 5 is the control apparatus according to claim 4 further comprising operating state-determining means (ECU 2 steps 25 and 27) for determining in which of a predetermined temperature-increasing operating region (second operating region F) where the intake gases are increased in temperature by the intercooler 32, and a predetermined cooling operating region (third operating region G) where the intake gases are cooled by the intercooler 32, the engine 3 is, and intake gas temperature parameter-acquiring means (outside air temperature sensor 85 for acquiring an intake gas temperature parameter which has a correlation with a temperature of intake gases flowing into the intercooler 32, wherein when it is determined that the engine 3 is in the temperature-increasing operating region, the control means performs the first control operation, and when it is determined that the engine 3 is in the cooling operating region, the control means performs the second control operation, and wherein the operating state-determining means corrects the temperature-increasing operating region and the cooling operating region according to the acquired intake gas temperature parameter (outside air temperature TA) (step 31).

According to this control apparatus, it is determined by the operating state-determining means which of the predetermined temperature-increasing operating region where the intake gases are increased in temperature by the intercooler, and the predetermined cooling operating region where the intake gases are cooled by the intercooler, the engine is in. Further, when it is determined that the engine is in the predetermined temperature-increasing operating region, the first control operation is performed, and when it is determined that the engine is in the predetermined cooling operating region, the second control operation is performed. Since the intake gases are increased in temperature by supercharging by the supercharging device, it is possible to properly determine whether or not the intake gases are in a condition to be increased in temperature by the intercooler, and whether or not the intake gases are in a condition to be cooled by the intercooler, according to the operating states of the engine.

Further, to adjust the temperature of the intake gases without generating condensed water in the intercooler, as the temperature of the intake gases flowing into the intercooler is lower, it is preferable to set the temperature-increasing operating region, which is an operating region of the engine where the intake gases are increased in temperature by the intercooler, to be larger, and set the cooling operating region, which is an operating region of the engine where the intake gases are cooled by the intercooler, to be smaller.

With the above-described configuration, the intake gas temperature parameter which has a correlation with the temperature of the intake gases flowing into the intercooler is acquired by the intake gas temperature parameter-acquiring means, and the temperature-increasing operating region and the cooling operating region are corrected according to the acquired intake gas temperature parameter. This makes it possible to properly determine in which of the temperature-increasing operating region where the intake gases are increased in temperature by the intercooler and the cooling operating region, the engine is, further according to the temperature of the intake gases flowing into the intercooler.

The invention according to claim 6 is the control apparatus according to claim 5, wherein the intake gas temperature parameter includes a temperature TA of outside air around the engine 3.

Further, in general, since outside air around the engine is drawn into the intake passage as intake gases, the temperature of the outside air has a close correlation with the temperature of intake gases flowing into the intercooler. According to the above-described control apparatus, since the intake gas temperature parameter includes the temperature of outside air around the engine, it is possible to more properly determine in which of the temperature-increasing operating region and the cooling operating region the above-described engine is.

The invention according to claim 7 is the control apparatus according to any one of claims 4 to 6, wherein the engine 3 further includes an engine cooling circuit 40 including a main radiator 41 for cooling cooling liquid in an engine body 3b, a main passage (engine cooling liquid passages 42) connected to the engine body 3b and the main radiator 41, for circulating the cooling liquid of the engine body 3b, a main pump (mechanical pump 43) provided in the main passage, for delivering the cooling liquid from the engine body 3b for circulation, and cools the engine body 3b, wherein the intake gas temperature-adjusting circuit 30 further includes a sub pump (electric pump 34) provided in the sub passage, for delivering the intake gas temperature-adjusting liquid for circulation, wherein temperature-adjusting liquid is commonly used as the cooling liquid of the engine body 3b and the intake gas temperature-adjusting liquid, wherein the temperature-increasing device 50 includes a plurality of connecting passages (coolant inflow passage 51, coolant outflow passage 52) for circulating the temperature-adjusting liquid from one to the other of the engine cooling circuit 40 and the intake gas temperature-adjusting circuit 30, wherein the plurality of connecting passages include an inflow passage (coolant inflow passage 51) connected between a downstream side of the main pump and also an upstream side of the main radiator 41 of the engine cooling circuit 40, and a downstream side of the sub radiator 31 and also an upstream side of the sub pump of the intake gas temperature-adjusting circuit 30, for causing the temperature-adjusting liquid to flow from the engine cooling circuit 40 into the intake gas temperature-adjusting circuit 30, and an outflow passage (coolant outflow pas sage 52) connected between a downstream side of the sub pump and also an upstream side of the sub radiator 31 of the intake gas temperature-adjusting circuit 30, and the downstream side of the main pump and also the upstream side of the main radiator 41 of the engine cooling circuit 40, for causing the temperature-adjusting liquid to flow out from the intake gas temperature-adjusting circuit 30 into the engine cooling circuit 40, and wherein the temperature-increasing device 50 further includes a valve (temperature-increasing valve 53) provided in the inflow passage, for being opened when the temperature-adjusting liquid in the engine cooling circuit 40 is caused to flow into the intake gas temperature-adjusting circuit 30.

According to this control apparatus, the engine cooling circuit and the intake gas temperature-adjusting circuit are provided separately from each other. The former includes the main radiator, the main passage, and the main pump, and the latter includes the intercooler, the sub radiator, the sub passage, and the sub pump. The engine cooling circuit cools the engine body in which in which combustion operation is performed, and hence the temperature of the cooling liquid of the engine body becomes relatively high, while the intake gas temperature-adjusting circuit adjusts the temperature of the intake gases, and hence the temperature of the intake gas temperature-adjusting liquid becomes lower than the temperature of the cooling liquid of the engine body. Further, the temperature-adjusting liquid is commonly used as the cooling liquid of the engine body and the intake gas temperature-adjusting liquid.

Furthermore, the temperature-increasing device includes the plurality of connecting passages that connect the engine cooling circuit and the intake gas temperature-adjusting circuit to each other, and the valve provided in the connecting passage. The temperature-adjusting liquid can flow from one to the other of the two circuits via these connecting passages. Specifically, in the inflow passage of the connecting passages, the valve is opened, whereby part of the temperature-adjusting liquid circulating through the engine cooling circuit flows into the intake gas temperature-adjusting circuit via the inflow passage, and part of the temperature-adjusting liquid circulating through the intake gas temperature-adjusting circuit flows out into the engine cooling circuit via the outflow passage of the connecting passages. With this, the temperature-adjusting liquid (cooling liquid of the engine body) having a relatively high temperature, in the engine cooling circuit, is mixed into the temperature-adjusting liquid (intake gas temperature-adjusting liquid) in the intake gas temperature-adjusting circuit, so that it is possible to properly increase the temperature of the intake gas temperature-adjusting liquid.

Further, the inflow passage connects between the downstream side of the main pump and also the upstream side of the main radiator of the engine cooling circuit, and the downstream side of the sub radiator and also the upstream side of the sub pump of the intake gas temperature-adjusting circuit. The outflow passage connects between the downstream side of the sub pump and also the upstream side of the sub radiator of the intake gas temperature-adjusting circuit, and the downstream side of the main pump and also the upstream side of the main radiator of the engine cooling circuit. As described above, in the engine cooling circuit, a position via which the temperature-adjusting liquid flows out into the intake gas temperature-adjusting circuit, and a position via which the temperature-adjusting liquid flows in from the intake gas temperature-adjusting circuit are both commonly located downstream of the main pump and also upstream of the main radiator.

For this reason, in a case where the temperature-adjusting liquid is caused to flow between the engine cooling circuit and the intake gas temperature-adjusting circuit, it is possible to make a pressure difference of the flowing temperature-adjusting liquid very small. As described above, it is possible to suppress the pressure difference of the temperature-adjusting liquid flowing between the two circuits, and hence even when the opening of the valve provided in the inflow passage is made larger, it is possible to cause the temperature-adjusting liquid to properly flow from one to the other of the two circuits. In other words, it is possible to control the flow of the temperature-adjusting liquid between the engine cooling circuit and the intake gas temperature-adjusting circuit via the valve in a fine-grained manner, and therefore it is possible to properly control a rise in the temperature of the intake gas temperature-adjusting liquid.

DESCRIPTION OF EMBODIMENTS

Figure 1:
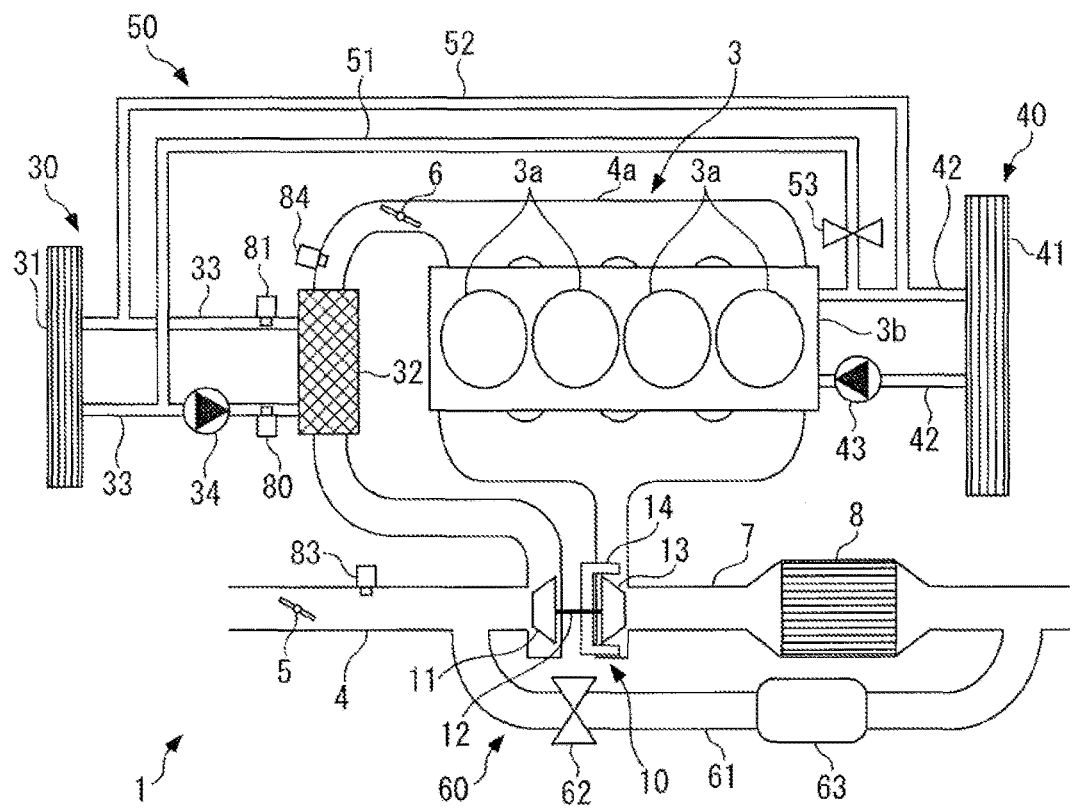
FIG. 1 A diagram schematically showing a control apparatus according to a first embodiment of the present invention and an internal combustion engine to which the control apparatus is applied.

A control apparatus for an internal combustion engine, according a first embodiment of the invention, will now be described with reference to drawings. The control apparatus 1 shown in FIGS. 1 and 2 controls an EGR amount of the internal combustion engine 3, the temperature of coolant in an intercooler 32, and so forth, and includes an ECU 2 shown in FIG. 2, etc. The ECU 2 performs various control processes, such as an EGR control process and an IC coolant temperature control process, as described hereinafter.

The internal combustion engine (hereinafter simply referred to as "the engine") 3 is a gasoline engine that has four cylinders 3a, and is installed on a vehicle (not shown) as a motive power source. Further, the engine 3 is provided with a turbocharger 10, an intake air cooling device 30, an EGN cooling device 40, a temperature-increasing device 50, an EGR device 60, and so forth.

The turbocharger 10 (supercharging device) is comprised of a compressor 11 disposed in an intake passage 4, a turbine 13 disposed in an exhaust passage 7 for being rotated via a shaft 12 in unison with the compressor 11, a plurality of variable vanes 14, and a vane actuator 14a for actuating the variable vanes 14. In the turbocharger 10, when the turbine 13 is driven for rotation by exhaust gases flowing though the exhaust passage 7, the compressor 11 integrally formed therewith simultaneously rotates, whereby a supercharging operation is performed in which the turbocharger 10 delivers intake gases in the intake passage 4 (hereinafter referred to as "intake air") toward the cylinders 3a while pressurizing the intake air.

The variable vanes 14 are rotatably attached to a wall portion of a housing (not shown) that houses the turbine 13, and are mechanically connected to the vane actuator 14a. An opening of each variable vane 14 is controlled by the ECU 2 via the vane actuator 14a. With this control, the amount of exhaust gases blown to the turbine 13 is changed, and accordingly the rotational speeds of the turbine 13 and the compressor 11 are changed, whereby a boost pressure is controlled.

Further, the above-mentioned intake air cooling device 30 (first cooling device) is for cooling intake air which has been increased in temperature by being pressurized by the compressor 11 of the turbocharger 10, and includes a sub radiator 31 (first radiator), an intercooler 32, IC coolant passages 33 connecting these, an electric pump 34, and so forth. These elements 31 to 34 form an intake air cooling circuit through which coolant for cooling intake air (hereinafter referred to as "intake air coolant") circulates.

Figure 2:
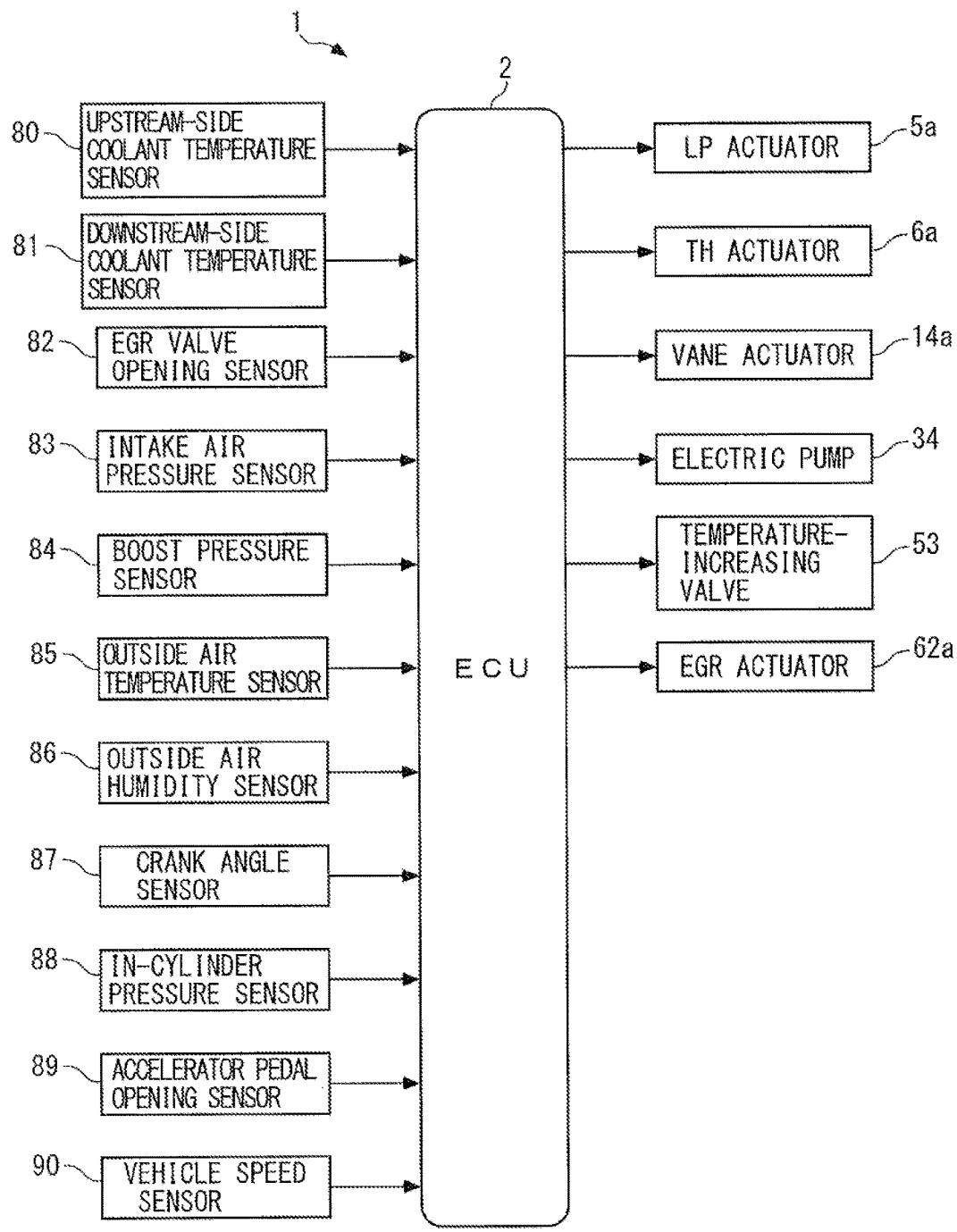
FIG. 2 An block diagram showing the electrical configuration of the control apparatus.

In the intake air cooling device 30, when the electric pump 34 is driven by a control signal from the ECU 2, intake air coolant is delivered from the electric pump 34 into the intercooler 32, whereby the intake air coolant is circulated through the intake air cooling circuit counterclockwise, as viewed in FIG. 1. Further, an upstream-side coolant temperature sensor 80 is provided in the IC coolant passage 33 at a location between the electric pump 34 and the intercooler 32. The upstream-side coolant temperature sensor 80 detects a temperature of intake air coolant on the upstream side of the intercooler 32 (hereinafter referred to as the "IC coolant temperature") TWic, and delivers a detection signal indicative of the detected IC coolant temperature TWic to the ECU 2. Furthermore, a downstream-side coolant temperature sensor 81 is provided in the IC coolant passage 33 at a location immediately downstream of the intercooler 32. The downstream-side coolant temperature sensor 81 detects a temperature TWDS of intake air coolant on the immediately downstream side of the intercooler 32, and delivers a detection signal indicative of the detected temperature TWDS to the ECU 2.

Further, the above-mentioned EGN cooling device 40 (second cooling device) is for cooling an engine body 3b which has been increased in temperature along with operation of the engine 3, and includes a coolant passage (not shown) in the engine body 3b, a main radiator 41 (second radiator), ENG coolant passages 42 connecting these, a mechanical pump 43 driven by a crankshaft (not shown) of the engine 3, and so forth. These elements 41 to 43 and the coolant passage in the engine body 3b form an ENG cooling circuit through which coolant for cooling the engine (hereinafter referred to as "ENG coolant") circulates.

In the EGN cooling device 40, during operation of the engine 3, as the mechanical pump 43 is driven by the motive power of the engine 3, ENG coolant is delivered from the mechanical pump 43 into the engine body 3b, whereby the ENG coolant is circulated through the ENG cooling circuit clockwise, as viewed in FIG. 1.

In this case, when a temperature-increasing valve 53, described hereinafter, is closed, the intake air cooling circuit including the intercooler 32 is isolated from the ENG cooling circuit by the temperature-increasing valve 53, and becomes an independent cooling circuit, and hence heat from the engine 3 is not transmitted to the intake air cooling circuit. As a consequence, the IC coolant temperature TWic becomes slightly higher than an outside air temperature.

Furthermore, the above-mentioned temperature-increasing device 50 is for supplying ENG coolant higher in temperature than intake air coolant when the IC coolant temperature TWic needs to be increased, and includes a coolant inflow passage 51, a coolant outflow passage 52, the temperature-increasing valve 53, and so forth.

The coolant inflow passage 51 has one end thereof connected to a portion of one of the ENG coolant passages 42 which is not provided with the mechanical pump 43, at a location between the main radiator 41 and the engine body 3b, and the other end thereof connected to a portion of the IC coolant passage 33 at a location between the sub radiator 31 and the electric pump 34. Further, the coolant outflow passage 52 has one end thereof connected to a portion of the ENG coolant passage 42 at a location between a connecting portion of the ENG coolant passage 42 to the coolant inflow passage 51 and the main radiator 41, and the other end thereof connected to a portion of one of the IC coolant passages 33 which is not provided with the electric pump 34, at a location between the sub radiator 31 and the intercooler 32.

Furthermore, the temperature-increasing valve 53 is provided in the coolant inflow passage 51, and is configured such that an opening thereof can be linearly changed between a fully-open state and a fully-closed state. Further, during execution of a first coolant temperature control process or a second coolant temperature control process, described hereinafter, the opening of the temperature-increasing valve 53 is controlled by a control input signal from the ECU 2 such that the IC coolant temperature TWic becomes equal to a first target temperature TWcmd1 or a second target temperature TWcmd2, referred to hereinafter.

In the case of the temperature-increasing device 50, during operation of the engine 3 and the electric pump 34, when the temperature-increasing valve 53 is controlled to an open state, ENG coolant in the ENG cooling circuit flows into the intake air cooling circuit via the coolant inflow passage 51, and is mixed into intake air coolant. Then, as the intake air coolant circulates through the intake air cooling circuit counterclockwise, as viewed in FIG. 1, part of the intake air coolant is returned to the ENG cooling circuit via the coolant outflow passage 52. With the above operation, high-temperature ENG coolant flows into the intake air cooling circuit, whereby the IC coolant temperature TWic is increased.

Further, during operation of the engine 3 and the electric pump 34, when the temperature-increasing valve 53 is controlled to the fully-closed state, the ENG coolant circulates only through the ENG cooling circuit instead of flowing into the intake air cooling circuit, while the intake air coolant circulates only through the intake air cooling circuit, whereby the intake air coolant is brought into a state of being cooled to an outside air temperature level by the sub radiator 31.

Furthermore, the above-mentioned EGR device 60 is for recirculating part of exhaust gases from the exhaust passage 7 into the intake passage 4, and is comprised of an EGR passage 61, an EGR valve 62, an EGR cooler 63, and so forth. One end of the EGR passage 61 is connected to a portion of the intake passage 4 at a location upstream of the compressor 11, and the other end thereof is connected to a portion of the exhaust passage 7 at a location downstream of an exhaust gas purifying catalyst 8.

Further, the EGR valve 62 is a butterfly type, and is connected to an EGR actuator 62a comprised of a DC motor. A control input signal from the ECU 2 is supplied to the EGR actuator 62a, whereby the opening of the EGR valve 62 is controlled. With this, the amount of exhaust gases recirculated from the exhaust passage 7 into the intake passage 4, that is, the EGR amount is controlled.

On the other hand, an EGR valve opening sensor 82 is provided in the vicinity of the EGR actuator 62a. The EGR valve opening sensor 82 detects the opening of the EGR valve (hereinafter referred to as the "EGR valve opening") Vegr, and delivers a detection signal indicative of the detected EGR valve opening Vegr to the ECU 2.

Furthermore, the EGR cooler 63 is a water-cooled type disposed in the EGR passage 61 at a location closer to the exhaust passage 7 than the EGR valve 62, and cools high-temperature recirculated gases flowing through the EGR passage 61 using coolant in the EGN cooling device 40.

On the other hand, in the intake passage 4, there are provided an LP intake throttle valve 5, an intake air pressure sensor 83, a boost pressure sensor 84, and a throttle valve 6, from upstream in the mentioned order. The LP intake throttle valve 5 is for generating a weak negative pressure near a connecting portion of the intake passage 4 to the EGR passage 61, to thereby stably introduce EGR gases into the intake passage 4. A control input signal from the ECU 2 is supplied to an LP actuator 5a, whereby the opening of the LP intake throttle valve 5 is controlled.

The intake air pressure sensor 83 detects pressure in the intake passage 4 on the upstream side of the compressor 11 as an EGR introducing portion pressure, and delivers a detection signal indicative of the detected EGR introducing portion pressure to the ECU 2. The boost pressure sensor 84 detects pressure in the intake passage 4 at a location immediately downstream of the intercooler 32 as a boost pressure PB, and delivers a detection signal indicative of the detected boost pressure PB to the ECU 2.

Further, the throttle valve 6 is pivotally disposed in the intake passage 4 at a location between the intercooler 32 and an intake manifold 4a. In the case of the throttle valve 6, a control input signal from the ECU 2 is supplied to a TH actuator 6a, whereby the opening of the throttle valve 6 is controlled. With this, the amount of intake air passing through the throttle valve 6 is controlled.

Furthermore, the exhaust gas purifying catalyst 8 is provided in the exhaust passage 7 at a location downstream of the turbine 13. The exhaust gas purifying catalyst 8 is implemented e.g. by a three-way catalyst, and purifies exhaust gases by oxidizing HC and CO and reducing NOx in the exhaust gases flowing through the exhaust passage 7.

On the other hand, an outside air temperature sensor 85, an outside air humidity sensor 86, a crank angle sensor 87, an in-cylinder pressure sensor 88, an accelerator pedal opening sensor 89, and a vehicle speed sensor 90 are electrically connected to the ECU 2. The outside air temperature sensor 85 delivers a detection signal indicative of a temperature of outside air around the vehicle (hereinafter referred to as the "outside air temperature") TA, to the ECU 2, and the outside air humidity sensor 86 delivers a detection signal indicative of the absolute humidity of outside air (hereinafter referred to as the "outside air humidity") HA, to the ECU 2.

Further, the crank angle sensor 87 is comprised of a magnet rotor and an MRE pickup, and delivers a CRK signal, which is a pulse signal, to the ECU 2 along with rotation of the crankshaft. Each pulse of the CRK signal is delivered whenever the crankshaft rotates through a predetermined crank angle (e.g. 1°). The ECU 2 calculates a rotational speed of the engine 3 (hereinafter referred to as the "engine speed") NE based on the CRK signal.

Furthermore, the in-cylinder pressure sensor 88 delivers a detection signal indicative of pressure in the cylinder 3a (hereinafter referred to as the "in-cylinder pressure") PCYL, to the ECU 2, the accelerator pedal opening sensor 89 delivers a detection signal indicative of a stepped-on amount of an accelerator pedal (not shown) of the vehicle (hereinafter referred to as "the accelerator pedal opening") AP, to the ECU 2, and the vehicle speed sensor 90 delivers a detection signal indicative of a speed of the vehicle (hereafter referred to as the "vehicle speed") VP, to the ECU 2.

The ECU 2 is implemented by a microcomputer comprised of a CPU, a RAM, a ROM, and an I/O interface (none of which are shown), and performs various control processes, such as an EGR control process and an IC coolant temperature control process, described hereinafter, according to the detection signals from the aforementioned sensors 80 to 90, and so forth. In doing this, the ECU 2 stores various kinds of calculated or set values in the RAM. Note that in the present embodiment, the ECU 2 corresponds to operating region-determining means, EGR control means, first coolant temperature control means, second coolant temperature control means, and coolant temperature control-stopping means.

Figure 3:
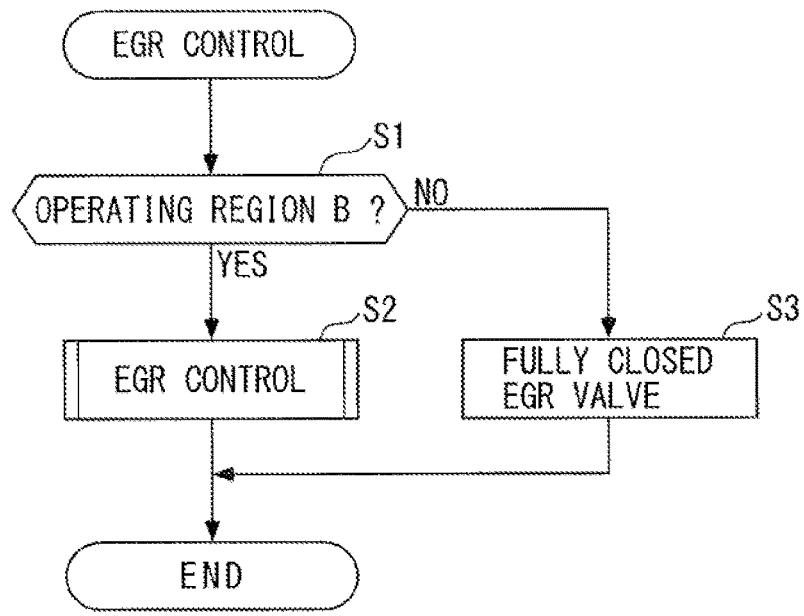
FIG. 3 A flowchart of an EGR control process.

Next, the EGR control process will be described with reference to FIG. 3. The EGR control process controls the EGR amount by controlling the opening of the EGR valve 62, and is performed by the ECU 2 at a predetermined control period.

Figure 4:
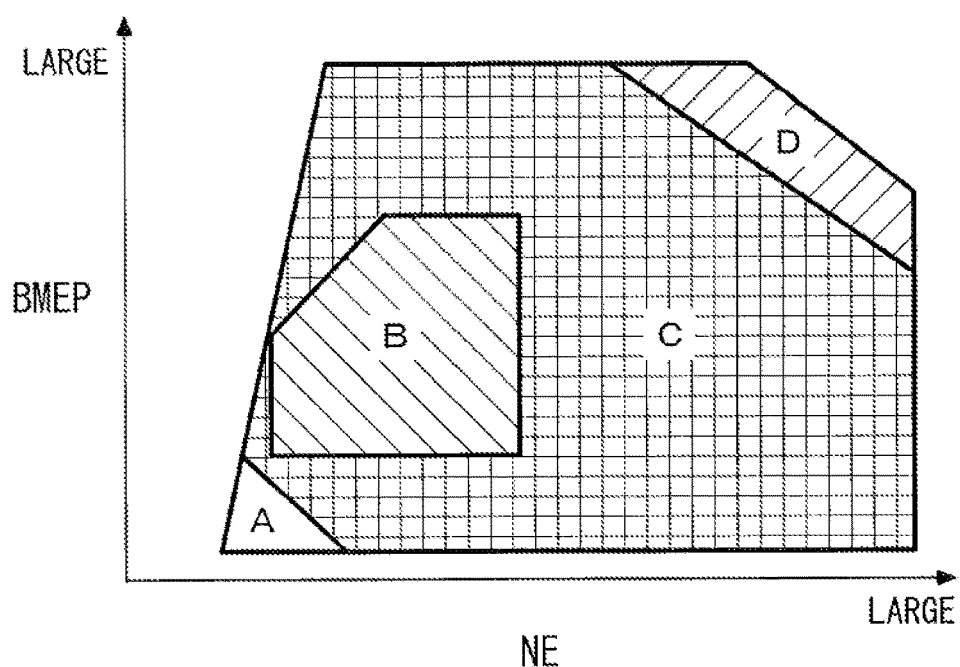
FIG. 4 A diagram showing an example of a map for use in determining operating regions of the engine.

As shown in the figure, first, in a step 1 (shown as S1; similarly shown hereafter), it is determined whether or not an operating region of the engine 3 is in an EGR execution region B (illustrated as a hatched region), by searching a map shown in FIG. 4 according to a net average effective pressure BMEP and the engine speed NE.

As shown in the figure, the operating region of the engine 3 is a region determined by a combination of the net average effective pressure BMEP and the engine speed NE. The net average effective pressure BMEP is calculated in a fuel injection control process, not shown, according to the engine speed NE and the accelerator pedal opening AP. Further, in the figure, three regions A, C, and D other than the EGR execution region B are EGR stop regions in which an EGR operation should be stopped. In the following, out of the above three EGR stop regions, the region C, which is cross-hatched, is referred to as the "second coolant temperature control execution region C", the region A, which is not cross-hatched or hatched, on a very low-load side and a very low-engine speed side, is referred to as the "first stop region A", and the region D, which is hatched, on a very high-load side and a very high-engine speed side, is referred to as the "second stop region D".

If the answer to the question of the step 1 is affirmative (YES), i.e. if the operating region of the engine 3 is in the EGR execution region B, it is determined that the EGR control process should be performed, and the process proceeds to a step 2, wherein the EGR control process is performed.

In the EGR control process, a target opening is calculated as a value obtained by converting an EGR gas amount required according to the net average effective pressure BMEP and the engine speed NE to the EGR valve opening Vegr, and the EGR valve 62 is feedback-controlled such that the EGR valve opening Vegr becomes equal to the target opening. In the step 2, the EGR control process is thus performed, followed by terminating the present process.

On the other hand, if the answer to the question of the step 1 is negative (NO), i.e. if the EGR control should be stopped, the process proceeds to a step 3, wherein the EGR valve 62 is controlled to the fully-closed state, followed by terminating the present process.

Figure 5:
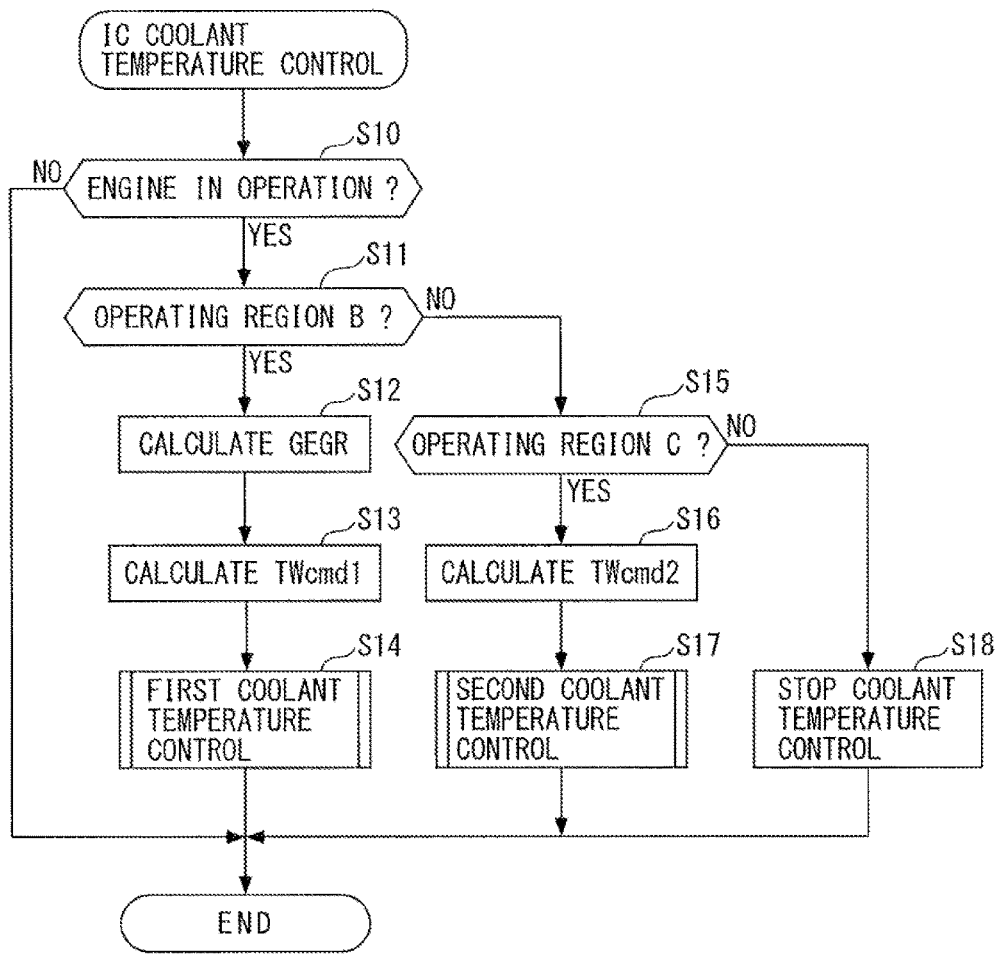
FIG. 5 A flowchart of an IC coolant temperature control process.

Next, the IC coolant temperature control process will be described with reference to FIG. 5. The IC coolant temperature control process controls the IC coolant temperature TWic by controlling the temperature-increasing valve 53 of the above-described temperature-increasing device 50 and the electric pump 34, and is performed by the ECU 2 at a predetermined control period.

As shown in the figure, first, in a step 10, it is determined whether or not the engine is in operation. If the answer to this question is negative (NO), i.e. if the engine 3 is at rest, the present process is immediately terminated.

On the other hand, if the answer to the question of the step 10 is affirmative (YES), the process proceeds to a step 11, wherein it is determined whether or not the operating region of the engine 3 is in the above-mentioned EGR execution region B, by searching the map described above with reference to FIG. 4 according to the net average effective pressure BMEP and the engine speed NE.

If the answer to this question is affirmative (YES), the process proceeds to a step 12, wherein an EGR amount GEGR is calculated by searching a map, not shown, according to the net average effective pressure BMEP and the engine speed NE.

Then, the process proceeds to a step 13, wherein the first target temperature TWcmd1 is calculated by searching a map, not shown, according to the EGR amount GEGR, the boost pressure PB, and the outside air humidity HA. The first target temperature TWcmd1 is set to a value which will cause the temperature of intake air having passed through the intercooler 32 to become higher than a dew-point temperature, on condition that TWic≥TWcmd1 holds during execution of the EGR control.

Then, the process proceeds to a step 14, wherein the first coolant temperature control process is performed. In the first coolant temperature control process, the opening of the temperature-increasing valve 53 is controlled according to a delivery amount of the electric pump 34 such that the IC coolant temperature TWic becomes equal to the first target temperature TWcmd1.

After the first coolant temperature control process is performed in the step 14 as described above, the present process is terminated.

On the other hand, if the answer to the question of the step 11 is negative (NO), i.e. if the operating region of the engine 3 is not in the above-mentioned EGR execution region B, the process proceeds to a step 15, wherein it is determined whether or not the operating region of the engine 3 is in the second coolant temperature control execution region C, by searching the map described above with reference to FIG. 4 according to the net average effective pressure BMEP and the engine speed NE.

If the answer to this question is affirmative (YES), it is determined that the second coolant temperature control process for controlling the IC coolant temperature TWic should be performed during stoppage of the EGR control, and the process proceeds to a step 16, wherein the second target temperature TWcmd2 is calculated by searching a map, not shown, according to the boost pressure PB and the outside air humidity HA.

The second target temperature TWcmd2 is set as a value corresponding to the largest load point in the EGR execution region B. This is because in a case where the operating region of the engine 3 is in the second coolant temperature control execution region C, an exhaust gas-recirculating operation by the EGR device 60 is not performed, and hence there is no fear that condensed water is generated in intake air passing through the intercooler 32, but it is intended to ensure beforehand a state where the IC coolant temperature TWic≥TWcmd1 holds when the operating region of the engine 3 has shifted from the second coolant temperature control execution region C to the EGR execution region B.

Then, the process proceeds to a step 17, wherein the second coolant temperature control process is performed. In the second coolant temperature control process, the opening of the temperature-increasing valve 53 is controlled according to the delivery amount of the electric pump 34 such that the IC coolant temperature TWic becomes equal to the second target temperature TWcmd2.

After the second coolant temperature control process is performed in the step 17 as described above, the present process is terminated.

On the other hand, if the answer to the question of the step 15 is negative (NO), i.e. if the operating region of the engine 3 is in the first stop region A or the second stop region D, the process proceeds to a step 18, wherein the coolant temperature control process is stopped. Specifically, the temperature-increasing valve 53 is held in the fully-closed state. After the step 18 is executed as described above, the present process is terminated.

As described above, according to the control apparatus 1 of the present embodiment, when the operating region of the engine 3 is in the EGR execution region B, the EGR control process is performed, whereas when the operating region of the engine 3 is in the region A, C, or D other than the EGR execution region B, the EGR control process is stopped. In the case of the engine 3 of the present embodiment, when the EGR control process is performed, recirculated gases are introduced into the upstream side of the intercooler 32, so that when intake air having the recirculated gases mixed therein passes through the intercooler 32, the intake air is cooled by the intercooler 32, and when the temperature of the intake air becomes equal to or lower than the dew-point temperature, there is a possibility of generation of condensed water.

However, according to the control apparatus 1, when the operating region of the engine 3 is in the EGR execution region B, the first coolant temperature control process is performed. In the first coolant temperature control process, the IC coolant temperature TWic is controlled such that it becomes equal to the first target temperature TWcmd1, and the first target temperature TWcmd1 is set to a value which will cause the temperature of intake air having passed through the intercooler 32 to become higher than the dew-point temperature, on condition that TWic≥TWcmd1 holds during execution of the EGR control. Therefore, it is possible to prevent condensed water from being generated in the intake air when the intake air passes through the intercooler 32 during execution of the EGR control.

Further, when the operating region of the engine 3 is in the second coolant temperature control execution region C, the second coolant temperature control process is performed. In the second coolant temperature control process, the IC coolant temperature TWic is controlled such that it becomes equal to the second target temperature TWcmd2, and the second target temperature TWcmd2 is set to such a value as will cause, on condition that TWic≥TWcmd2 holds, TWic≥TWcmd1 to hold at the start time of the EGR control process to thereby make the temperature of the intake air having passed through the intercooler 32 higher than the dew-point temperature, assuming that in a subsequent control time, the operating region of the engine 3 shifts to the EGR execution region B to start the EGR control process. With this, even when the operating region of the engine 3 shifts to the EGR execution region B in a subsequent control time, it is possible to quickly start the EGR control while preventing condensed water from being generated in the intake air. From the above, it is possible to ensure excellent fuel economy, thereby making it possible to enhance marketability.

Furthermore, the temperature-increasing device 50 is configured to increase the temperature of coolant in the intake air cooling circuit by introducing ENG coolant in the EGN cooling device 40 into the intake air cooling circuit of the intake air cooling device 30, and therefore, by using the EGN cooling device 40 originally provided in the water-cooled engine 3, it is possible to realize the temperature-increasing device 50 while suppressing an increase in the number of component parts. This makes it possible to further enhance marketability.

In addition to this, in the map shown in FIG. 4, the second coolant temperature control execution region C is set to include operating regions on a lower load side and a higher load side than the EGR execution region B, and an operating region on a higher engine speed side than the EGR execution region B, so that it is possible to properly stop the EGR control in operating regions, such as a high-load region, a high-engine speed region, and a low-load region, in which execution of the EGR control may cause degradation of an operating state of the engine 3 and reduction of output power generated by the engine 3.

Further, the first stop region A is set as a region on a lower load side and a lower engine speed side than the second coolant temperature control execution region C, i.e. an operating region on the very low-load side and the very low-engine speed side, and the second stop region D is set as a region on a higher load side and a higher engine speed side than the second coolant temperature control execution region C, i.e. an operating region on the very high-load side and the very high-engine speed side. When the operating region of the engine 3 is in the first stop region A or the second stop region D, the first coolant temperature control process and the second coolant temperature control process are stopped. In the water-cooled engine 3, when the operating region thereof is in the operating region on the very low-load side and the very low-engine speed side, if the coolant temperature control is performed by introducing coolant in the second cooling circuit into the first cooling circuit, the temperature of the engine 3 itself is lowered, which can result in degradation of fuel economy and heater performance. However, according to the control apparatus 1, when the operating region of the engine 3 is in the first stop region A on the very low-load side and the very low-engine speed side, the first coolant temperature control process and the second coolant temperature control process are stopped, and hence it is possible to avoid such degradation of fuel economy and heater performance.

Further, in a case where the operating region of the engine 3 is in the operating region on the very high-load side and the very high-engine speed side, intake air is brought into a state in which condensed water is difficult to be generated, whereby it becomes unnecessary to perform the coolant temperature control, and in a case where the coolant temperature control is continued, the IC coolant temperature TWic continues to rise, which can cause reduction of cooling efficiency and degradation of fuel economy. However, according to the control apparatus 1, when the operating region of the engine 3 is in the second stop region D on the very high-load side and the very high-engine speed side, the first coolant temperature control process and the second coolant temperature control process are stopped, and hence it is possible to avoid degradation of fuel economy and reduction of cooling efficiency as mentioned above.

Note that although the first embodiment is an example in which the turbocharger 10 is used as a supercharging device, the supercharging device of the present invention is not limited to this, but any suitable supercharging device maybe employed insofar as it pressurizes intake air in the intake passage. For example, as the supercharging device, there may be employed a supercharger.

Further, although the first embodiment is an example in which the control apparatus of the present invention is applied to the gasoline internal combustion engine 3, the control apparatus of the present invention is not limited to this, but can also be applied to an internal combustion engine equipped with a supercharging device, an EGR device, a first cooling device, and a temperature-increasing device. For example, the control apparatus of the present invention may be applied to an internal combustion engine using light oil or natural gases as fuel.

Furthermore, although the first embodiment is an example in which the control apparatus of the present invention is applied to the internal combustion engine 3 of water-cooled type, the control apparatus of the present invention may be applied to an internal combustion engine of air-cooled type.

On the other hand, although the first embodiment is an example in which the temperature-increasing device 50 is used as a temperature-increasing device for increasing the temperature of coolant in the first cooling circuit of the first cooling device, the temperature-increasing device of the present invention is not limited to this, but any suitable temperature-increasing device may be employed insofar as it is capable of increasing the temperature of the coolant in the first cooling circuit. For example, a hot-wire heater may be used as the temperature-increasing device.

Further, although the first embodiment is an example in which the intake air cooling device 30 including the intercooler 32 is used as an intake air cooling device, the intake air cooling device of the present invention is not limited to this, but any suitable intake air cooling device maybe employed insofar as it cools intake air using coolant circulating through the first radiator and the first cooling circuit.

Next, a description will be given of a control apparatus for an internal combustion engine, according to a second embodiment of the present invention. Compared with the control apparatus 1 according to the first embodiment, the control apparatus of the present embodiment has the same electrical and mechanical arrangements, and as described hereinafter, is different only in details of the control process. Therefore, the following description is given mainly of different points from the first embodiment.

Note that in the description of the second embodiment, the above-mentioned IC coolant temperature TWic is referred to as the "upstream-side low-temperature system coolant temperature TWUS", and the temperature TWDS of the intake air coolant detected by the above-mentioned downstream-side coolant temperature sensor 81 is referred to as the "downstream-side low-temperature system coolant temperature TWDS". Further, the above-described intake air cooling device 30 is referred to as the "intake gas temperature-adjusting circuit 30", the above-described IC coolant passages 33 are referred to as the "IC temperature-adjusting liquid passages 33", and the above-described intake air coolant is referred to as the "low-temperature system temperature-adjusting liquid". Furthermore, the above-described EGN cooling device 40 is referred to as the "engine cooling circuit 40", the ENG coolant passages 42 are referred to as the "engine cooling liquid passages 42", and the above-described ENG coolant is referred to as the "high-temperature system cooling liquid". Further, the component elements other than these are denoted by the same names and reference numerals as those of the first embodiment.

In this control apparatus, as described hereinafter, the electric pump 34 and the temperature-increasing valve 53 are controlled by the ECU 2. Specifically, demanded torque of the engine 3 is calculated by searching a predetermined map (not shown) according to the detected accelerator pedal opening AP, and the electric pump 34 is controlled according to the calculated demanded torque. In this case, as the demanded torque is larger, the delivery amount of the electric pump 34 is controlled to a larger value. This is for increasing the degree of cooling the intake gases by the intercooler 32 according to an increase in the degree of rise in the temperature of the intake gases due to supercharging thereof, because as the demanded torque is larger, the boost pressure is controlled to a larger value, whereby the degree of rise in the temperature of the intake gases due to the supercharging becomes higher.

Further, as is clear from the above-described arrangement, intake gases flowing into the intercooler 32 include EGR gases recirculated by the EGR device 60, and the EGR gases include a relatively large amount of water vapor. The ECU 2 performs the process shown in FIG. 6 to control the temperature-increasing valve 53 in order to properly adjust the temperature of the intake gases without generating condensed water in the intercooler 32. The present process is repeatedly performed during operation of the engine 3 at predetermined time intervals (e.g. 100 msec).

Figure 6:
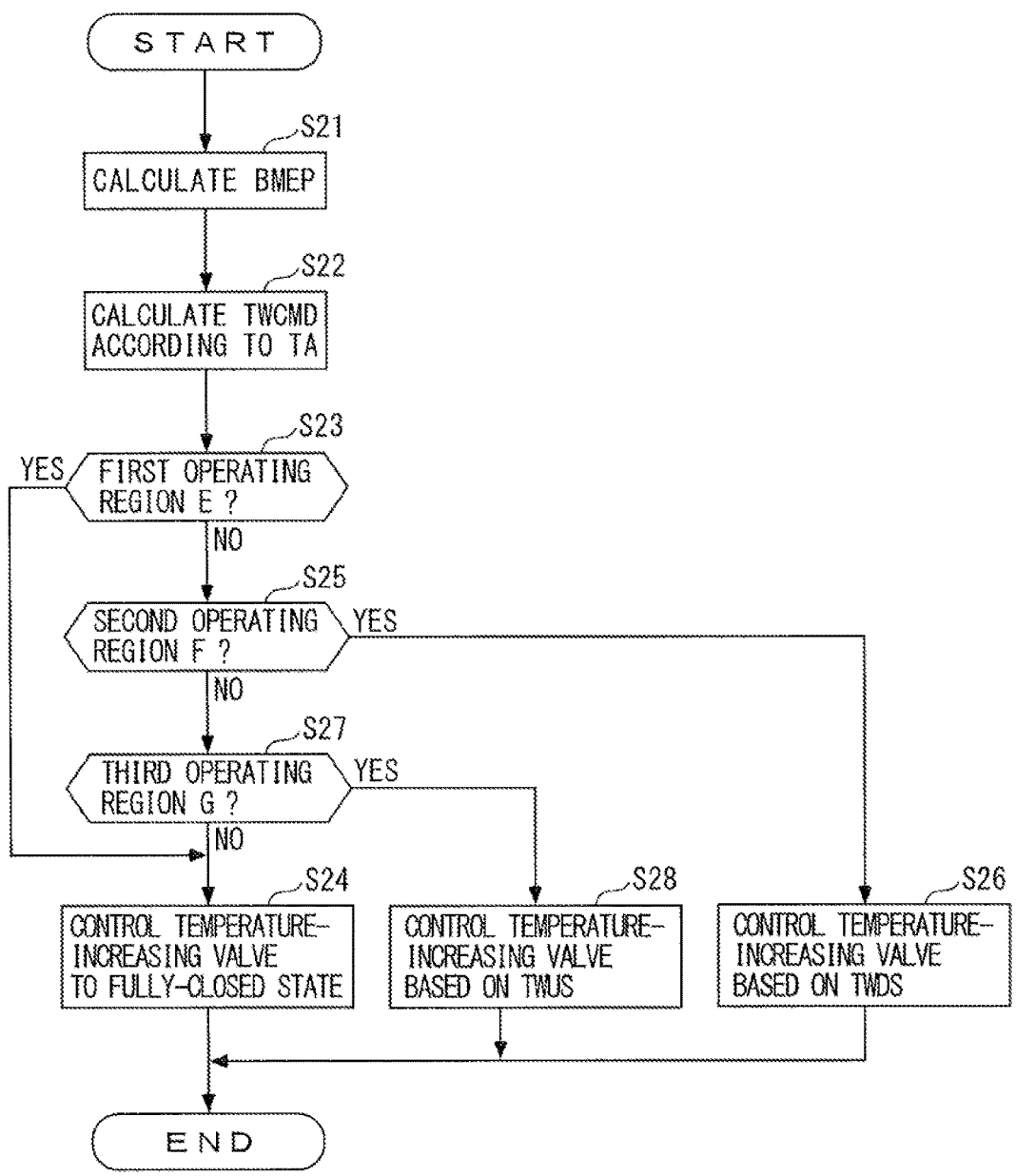
FIG. 6 A flowchart of a process executed by an ECU of a second embodiment, for controlling a temperature-increasing valve.

First, in a step 21 in FIG. 6, the net average effective pressure BMPE is calculated according to the in-cylinder pressure PCYL, etc. Then, a target temperature TWCMD is calculated by searching a predetermined map (not shown) according to the detected outside air temperature TA (step 22).

The target temperature TWCMD is a target value of the upstream-side low-temperature system coolant temperature TWUS and the downstream-side low-temperature system coolant temperature TWDS. In the above-described map, the target temperature TWCMD is set to a value slightly higher than the dew-point temperature based on the relationship between the temperature (outside air temperature) and the dew-point temperature such that the temperature of intake gases on the downstream side of the intercooler 32 becomes higher than the dew-point temperature of the intake gases, and is set to a larger value as the outside air temperature TA is higher.

Note that the method of calculating the target temperature TWCMD is not limited to the above-described method, but any other suitable method can be employed. The target temperature TWCMD may be calculated further according to the amount of EGR gases in intake gases, the temperature of EGR gases, or the like.

In the following step 23 et seq., an operating state of the engine 3 is determined based on the calculated engine speed NE and the net average effective pressure BMEP, and the operation of the temperature-increasing valve 53 is controlled according to the determined operating state of the engine 3. The determination of the operating state of the engine 3 is performed according to an operating region map shown in FIG. 7. First, a description will be given of the operating region map.

Figure 7:
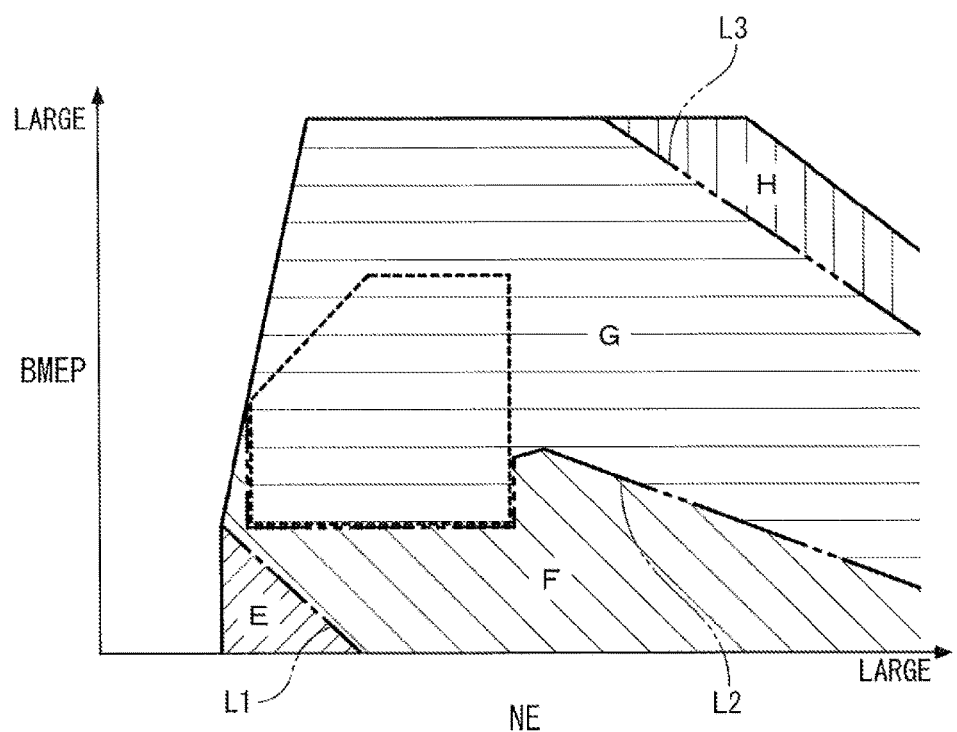
FIG. 7 A diagram showing an example of an operating region map used in the process in FIG. 6.

As shown in FIG. 7, in the operating region map, with respect to the engine speed NE and the net average effective pressure BMEP, all available operating regions of the engine 3 (hereinafter referred to as the "entire operating region") indicated by a solid line are defined in advance. Further, the entire operating region is partitioned into a predetermined first operating region E (indicated by hatching from upper right to lower left), a predetermined second operating region F (indicated by hatching from upper left to lower right), a predetermined third operating region G (indicated by horizontal hatching), and a predetermined fourth operating region H (indicated by vertical hatching), by a first boundary L1 (indicated by a one-dot chain line), a second boundary L2 (indicated by a two-dot chain line), and a third boundary L3 (indicated by a three-dot chain line).

The first and second operating regions E and F are set as an operating region of the engine 3 where intake gases are increased in temperature by the intercooler 32, assuming that it is after completion of warm-up of the engine 3, the outside air temperature TA is equal to a predetermined temperature (e.g. 25° C.), and also absolute humidity around the engine 3 is in a predetermined humidity range (e.g. 40 to 60%). Specifically, the first operating region E is set as a very low-engine speed and very low-load operating region of the engine 3, and the second operating region F is set as a low-to-high engine speed operating region of the engine 3, and also a very low-to-low load operating region of the engine 3.

As described above, the very low-to-high engine speed operating region of the engine 3, and also the very low-to-low load operating region of the engine 3 are set as the operating region of the engine 3 where intake gases are increased in temperature by the intercooler 32, for the following reason: In such operating regions of the engine 3, supercharging of the intake gases by the turbocharger 10 is not performed, or the boost pressure of the turbocharger 10 becomes relatively low and hence the degree of rise in the temperature of the intake gases due to the supercharging by the turbocharger 10 is very small. For this reason, when the intake gases are cooled by the intercooler 32, the temperature of the intake gases having flowed into the intercooler 32 becomes lower than the above-mentioned target temperature TWCMD, which can cause generation of condensed water in the intercooler 32. To suppress this generation of condensed water, the above operating regions of the engine 3 are set.

Further, the third and fourth operating regions G and H are set as an operating region of the engine 3 where intake gases are cooled by the intercooler 32, assuming that it is after completion of warm-up of the engine 3, the outside air temperature TA is equal to the above-mentioned predetermined temperature, and also the absolute humidity around the engine 3 is in the predetermined humidity range. Specifically, the third operating region G is set as the low-to-high engine speed operating region of the engine 3, and also a middle-to-high load operating region of the engine 3, and the fourth operating region H is set as the high-engine speed operating region of the engine 3, and also the high-load operating region of the engine 3.

As described above, the low-to-high engine speed operating region of the engine 3, and also the middle-to-high load operating region of the engine 3 are set as the operating region of the engine 3 where intake gases are cooled by the intercooler 32, for the following reason: In such operating regions of the engine 3, the boost pressure of the turbocharger 10 is relatively high, and the degree of rise in the temperature of the intake gases due to supercharging by the turbocharger 10 becomes higher, which can cause knocking of the engine 3 and reduction of the output of the engine 3. Therefore, the above operating regions of the engine 3 are set in order to suppress the knocking of the engine and the reduction of the engine output. Note that an operating region, enclosed by a broken line, in the third operating region G, indicates an operating region where the EGR operation is performed by the EGR device 60 (hereinafter referred to as the "EGR operating region").

Referring again to FIG. 6, in the step 23, it is determined whether or not the engine speed NE and the net average effective pressure BMEP are in the first operating region E shown in FIG. 7. If the answer to this question is affirmative (YES), i.e. if the engine speed NE and the net average effective pressure BMEP are in the first operating region E, it is determined that the engine 3 is in the operating region where intake gases are increased in temperature by the intercooler 32, and the temperature-increasing valve 53 is controlled to the fully-closed state (step 24), followed by terminating the present process.

When the engine 3 is in the very low-engine speed and very low-load operating region of the engine 3, the temperature-increasing valve 53 is controlled to the fully-closed state as described above, for the following reason: In such a case, when the temperature-increasing valve 53 is opened to thereby cause the high-temperature system cooling liquid to be mixed into the low-temperature system temperature-adjusting liquid, the temperature of the high-temperature system cooling liquid is lowered, which degrades fuel economy of the engine 3 and prevents the heating of the vehicle from working. To prevent these from occurring, the temperature-increasing valve 53 is controlled to the fully-closed state.

On the other hand, if the answer to the question of the step 23 is negative (NO), it is determined whether or not the engine speed NE and the net average effective pressure BMEP are in the second operating region F shown in FIG. 7 (step 25). If the answer to this question is affirmative (YES), i.e. if the engine speed NE and the net average effective pressure BMEP are in the second operating region F, it is determined that the engine 3 is in a predetermined temperature-increasing operating region where intake gases are increased in temperature by the intercooler 32, and the first control operation is executed for controlling the temperature-increasing valve 53 such that the downstream-side low-temperature system coolant temperature TWDS becomes equal to the target temperature TWCMD calculated in the step 22 (step 26), followed by terminating the present process.

Specifically, in the step 26, the difference between the downstream-side low-temperature system coolant temperature TWDS and the target temperature TWCMD is calculated, and a control input signal to the temperature-increasing valve 53 is calculated based on the calculated difference using a predetermined feedback control algorithm. With this, the downstream-side low-temperature system coolant temperature TWDS is feedback-controlled such that it becomes equal to the target temperature TWCMD. As a consequence, when the temperature of the intake gases is lower than the target temperature TWCMD, the intake gases are increased in temperature by heat exchange with the low-temperature system temperature-adjusting liquid in the intercooler 32.

On the other hand, if the answer to the question of the step 25 is negative (NO), it is determined whether or not the engine speed NE and the net average effective pressure BMEP are in the third operating region G shown in FIG. 7 (step 27). If the answer to this question is affirmative (YES), i.e. if the engine speed NE and the net average effective pressure BMEP are in the third operating region G, it is determined that the engine 3 is in a predetermined cooling operating region where intake gases are cooled by the intercooler 32, and the second control operation is executed for controlling the temperature-increasing valve 53 such that the upstream-side low-temperature system coolant temperature TWUS becomes equal to the target temperature TWCMD (step 28), followed by terminating the present process.

Specifically, in the step 28, the difference between the upstream-side low-temperature system coolant temperature TWUS and the target temperature TWCMD is calculated, and a control input signal to the temperature-increasing valve 53 is calculated based on the calculated difference using a predetermined feedback control algorithm. With this, the upstream-side low-temperature system coolant temperature TWUS is feedback-controlled such that it becomes equal to the target temperature TWCMD. As a consequence, when the temperature of the intake gases is higher than the target temperature TWCMD, the intake gases are cooled by heat exchange with the low-temperature system temperature-adjusting liquid in the intercooler 32.

On the other hand, if the answer to the question of the step 27 is negative (NO), i.e. if an operating state of the engine 3 represented by the engine speed NE and the net average effective pressure BMEP is in the fourth operating region H shown in FIG. 7, it is determined that the engine 3 is in the operating region of the engine 3 where intake gases are cooled by the intercooler 32, and the step 24 is executed, whereby the temperature-increasing valve 53 is controlled to the fully-closed state, followed by terminating the present process.

As described above, when the engine 3 is in the high-engine speed and high-load operating region, the temperature-increasing valve 53 is controlled to the fully-closed state for the following reason: In such a case, since the temperature of the intake gases is not lowered to the dew-point temperature of the intake gases in the intercooler 32 even when the low-temperature system temperature-adjusting liquid is not increased in temperature, there is no need to mix the high-temperature system cooling liquid into the low-temperature system temperature-adjusting liquid.

Further, as described above, the first to fourth operating regions E to H are operating regions which are provided assuming that the outside air temperature TA is equal to the above-mentioned predetermined temperature. Therefore, when the outside air temperature TA is lower than the predetermined temperature, the temperature of intake gases is more liable to reach the dew-point temperature thereof, whereby even when the temperature-increasing valve 53 is controlled in the step 23 et seq., condensed water can be generated in the intercooler 32. To prevent this inconvenience, the ECU 2 performs a process shown in FIG. 8 to thereby correct the first to fourth operating regions E to H. Similar to the process shown in FIG. 7, the present process is repeatedly performed at the above-mentioned predetermined time intervals.

Figure 8:
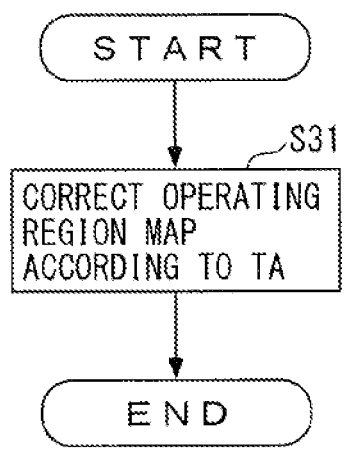
FIG. 8 A flowchart of a process executed by the ECU, for correcting the operating region map.

Specifically, in a step 31 in FIG. 8, the first to fourth operating regions E to H are corrected by changing the above-mentioned first to third boundaries L1 to L3 according to the detected outside air temperature TA. In this case, the first to third boundaries L1 to L3 are changed such that as the outside air temperature TA is lower, the second operating region F is expanded, and also the third operating region G is expanded toward the fourth operating region H. More specifically, for example, the first boundary L1 is changed such that a segment thereof is moved toward the first operating region E, the second boundary L2 is changed such that a segment thereof is moved toward the third operating region G, and the third boundary L3 is changed such that a segment thereof is moved toward the fourth operating region H.

From the above, the operating region map is corrected such that as the outside air temperature TA is lower, the second operating region F is expanded, and also the third operating region G is expanded toward the fourth operating region H. This is because since outside air around the engine 3 is drawn into the intake passage 4, intake gases flowing into the intercooler 32 are more liable to reach the dew-point temperature thereof as the outside air temperature TA is lower.

Further, correspondence between the various types of elements of the present embodiment and various types of elements of the present invention is as follows: The engine cooling liquid passages 42 and the mechanical pump 43 of the present embodiment correspond to a main passage and a main pump of the present invention, respectively, and the IC temperature-adjusting liquid passages 33 and the electric pump 34 of the present embodiment correspond to a sub passage and a sub pump of the present invention, respectively. Further, the upstream-side coolant temperature sensor 80 and the downstream-side coolant temperature sensor 81 of the present embodiment correspond to upstream-side liquid temperature-acquiring means and downstream-side liquid temperature-acquiring means of the present invention, respectively, and the coolant inflow passage 51 and the coolant outflow passage 52 of the present embodiment correspond to a plurality of connecting passages of the present invention.

Furthermore, the temperature-increasing valve 53 of the present embodiment corresponds to a valve of the present invention, the outside air temperature sensor 85 of the present embodiment corresponds to intake gas temperature parameter-acquiring means of the present invention, and the ECU 2 of the present embodiment corresponds to target temperature-calculating means, control means, and operating state-determining means of the present invention.

As described above, according to the present embodiment, in the intake gas temperature-adjusting circuit 30, the low-temperature system temperature-adjusting liquid circulates between the intercooler 32 provided in the intake passage 4 and the sub radiator 31 via the IC temperature-adjusting liquid passages 33. Further, the turbocharger 10 is provided in the intake passage 4 at a location upstream of the intercooler 32, and intake gases flowing into the intercooler 32 are increased in temperature by being supercharged by the turbocharger 10. The intake gases having flowed into the intercooler 32 are subjected to heat exchange with the low-temperature system temperature-adjusting liquid in the intercooler 32, whereby the temperature of the intake gases is adjusted. Furthermore, part of exhaust gases are recirculated to the upstream side of the intercooler 32 in the intake passage 4 as EGR gases by the EGR device 60. With this, intake gases including the EGR gases with a relatively large amount of water vapor flow into the intercooler 32.

Further, the upstream-side low-temperature system coolant temperature TWUS, which is the temperature of the low-temperature system temperature-adjusting liquid in the IC temperature-adjusting liquid passage 33 on the upstream side of the intercooler 32, is detected by the upstream-side coolant temperature sensor 80, and the downstream-side low-temperature system coolant temperature TWDS, which is the temperature of the low-temperature system temperature-adjusting liquid in the IC temperature-adjusting liquid passages 33 on the downstream side of the intercooler 32, is detected by the downstream-side coolant temperature sensor 81. Furthermore, the low-temperature system temperature-adjusting liquid is increased temperature by the temperature-increasing device 50.

Further, the target temperature of the low-temperature system temperature-adjusting liquid is calculated such that the temperature of intake gases on the downstream side of the intercooler 32 becomes higher than the dew-point temperature thereof (step 22 in FIG. 6), and it is determined which of the predetermined temperature-increasing operating region where intake gases are increased in temperature by the intercooler 32 and the predetermined cooling operating region where intake gases are cooled by the intercooler 32, the engine 3 is in (steps 25 and 27). Furthermore, when it is determined that the engine 3 is in the temperature-increasing operating region (YES to the step 25), the first control operation for controlling the temperature-increasing valve 53 of the temperature-increasing device 50 such that the detected downstream-side low-temperature system coolant temperature TWDS becomes equal to the calculated target temperature TWCMD is performed (step 26). Further, when it is determined that the engine 3 is in the cooling operating region (YES to the step 27), the second control operation for controlling the temperature-increasing valve 53 such that the detected upstream-side low-temperature system coolant temperature TWUS becomes equal to the target temperature TWCMD is performed (step 28).

As described above, when intake gases are increased in temperature by the intercooler 32, differently from the above-described conventional control apparatus disclosed in PTL 2, the temperature-increasing device 50 for increasing the temperature of the low-temperature system temperature-adjusting liquid is controlled such that the downstream-side low-temperature system coolant temperature TWDS becomes equal to the target temperature TWCMD, and hence the intake gases can be properly increased in temperature by the whole of the intercooler 32 from inlet to outlet thereof such that the temperature of the intake gases exceeds the dew-point temperature thereof, whereby it is possible to properly suppress generation of condensed water in the intercooler 32.

Further, when intake gases are cooled by the intercooler 32, the temperature-increasing device 50 is controlled such that the upstream-side low-temperature system coolant temperature TWUS becomes equal to the target temperature TWCMD, and hence the intake gases can be properly cooled by the whole of the intercooler 32 from inlet to outlet thereof such that the temperature of the intake gases is prevented from becoming lower than the dew-point temperature thereof, whereby it is possible to properly suppress generation of condensed water in the intercooler 32. From the above, the adjustment of the temperature of the intake gases by the intercooler 32 can be properly controlled, whereby it is possible to properly suppress generation of condensed water in the intercooler 32.

Further, since intake gases are increased in temperature by supercharging by the turbocharger 10, it is possible to properly determine whether or not the intake gases are in a condition to be increased in temperature by the intercooler 32 and whether or not the intake gases are in a condition to be cooled by the intercooler 32, according to the operating states of the engine 3.

Furthermore, when the engine speed NE and the net average effective pressure BMEP are in the predetermined second operating region F, it is determined that the engine 3 is in the temperature-increasing operating region, and when the engine speed NE and the net average effective pressure BMEP are in the third operating region G, it is determined that the engine 3 is in the cooling operating region. Further, the outside air temperature TA which has a correlation with the temperature of intake gases flowing into the intercooler 32 is detected by the outside air temperature sensor 85, and the second and third operating regions F and G are corrected according to the detected outside air temperature TA (step 31 in FIG. 8). This makes it possible to properly determine, according to the temperature of intake gases flowing into the intercooler 32, whether or not the engine 3 is in the temperature-increasing operating region where the intake gases are increased in temperature by the intercooler 32, and whether or not the engine 3 is in the cooling operating region where the intake gases are cooled by the intercooler 32.

Further, the engine cooling circuit 40 and the intake Baas temperature-adjusting circuit 30 are provided separately from each other. The former 40 includes the main radiator 41, the engine cooling liquid passages 42, and the mechanical pump 43, and the latter 30 includes the intercooler 32 the sub radiator 31, the IC temperature-adjusting liquid passages 33, and the electric pump 34. The engine cooling circuit 40 cools the engine body 3b in which combustion operation is performed, and hence the temperature of the high-temperature system cooling liquid becomes relatively high, while the intake gas temperature-adjusting circuit 30 adjusts the temperature of intake gases, and hence the temperature of the low-temperature system temperature-adjusting liquid becomes lower than the temperature of the high-temperature system cooling liquid. Further, temperature-adjusting liquid is commonly used as the high-temperature system cooling liquid and the low-temperature system temperature-adjusting liquid.

Further, the temperature-increasing device 50 includes the coolant inflow passage 51 and the coolant outflow passage 52 that connect the engine cooling circuit 40 and the intake gas temperature-adjusting circuit 30 to each other, and the temperature-increasing valve 53 provided in the coolant inflow passage 51. The temperature-adjusting liquid (the high-temperature system cooling liquid, the low-temperature system temperature-adjusting liquid) can flow from one to the other of the two circuits 30 and 40 via the above passages 51 and 52. Specifically, in the coolant inflow passage Si. the temperature-increasing valve 53 is opened, whereby part of the high-temperature system cooling liquid circulating through the engine cooling circuit 40 flows into the intake gas temperature-adjusting circuit 30 via the coolant inflow passage 51, and part of the low-temperature system temperature-adjusting liquid circulating through the intake gas temperature-adjusting circuit 30 flows out into the engine cooling circuit 40 via the coolant outflow passage 52. With this, the high-temperature system cooling liquid having a relatively high temperature, in the engine cooling circuit 40, is mixed into the low-temperature system temperature-adjusting liquid in the intake gas temperature-adjusting circuit 30, so that it is possible to properly increase the temperature of the low-temperature system temperature-adjusting liquid.

Further, the coolant inflow passage 51 connects between the downstream side of the mechanical pump 43 and also the upstream side of the main radiator 41 of the engine cooling circuit 40, and the downstream side of the sub radiator 31 and also the upstream side of the electric pump 34 of the intake gas temperature-adjusting circuit 30. The coolant outflow passage 52 connects between the downstream side of the electric pump 34 and the upstream side of the sub radiator 31 of the intake gas temperature-adjusting circuit 30, and the downstream side of the mechanical pump 43 and also the upstream side of the main radiator 41 of the engine cooling circuit 40. As described above, in the engine cooling circuit 40, a position via Which the high-temperature system cooling liquid flows out into the intake gas temperature-adjusting circuit 30, and a position via which the low-temperature system temperature-adjusting liquid flows in from the intake gas temperature-adjusting circuit 30 are both commonly located downstream of the mechanical pump 43 and also upstream of the main radiator 51.

For this reason, in a case where the temperature-adjusting liquid (the high-temperature system cooling liquid, the low-temperature system temperature-adjusting liquid) is caused to flow between the engine cooling circuit 40 and the intake gas temperature-adjusting circuit 30, it is possible to make a pressure difference of the flowing temperature-adjusting liquid very small. As described above, it is possible to suppress the pressure difference of the temperature-adjusting liquid flowing between the two circuits 30 and 40, so that even when the opening of the temperature-increasing valve 53 provided in the coolant inflow passage 51 is made larger, it is possible to cause the temperature-adjusting liquid to flow from one to the other of the two circuits 30 and 40. In other words, it is possible to control the flow of the temperature-adjusting liquid between the engine cooling circuit 40 and the intake gas temperature-adjusting circuit 30 via the temperature-increasing valve 53 in a fine-grained manner, and therefore it is possible to properly control a rise in the temperature of the low-temperature system temperature-adjusting liquid.

Further, as shown in FIG. 7, the second and third operating regions F and G are set to be larger than the above-mentioned EGR operating region where the EGR operation is performed (indicated by a broken line), and further overlap the EGR operating region. With this, even when the execution and stop of the EGR operation are switched in a short time period due to a sudden change in the operating state of the engine 3, the first and second control operations are performed based on the target temperature TWCMD in the steps 26 and 28, and hence it is possible to always properly hold the temperature of intake gases in a state higher than the dew-point temperature, whereby it is possible to start the EGR operation without a fear of generation of condensed water.

Note that the present invention is by no means limited to the above-described second embodiment, but can be practiced in various forms. For example, although in the second embodiment, coolant, which is temperature-adjusting liquid formed e.g. by water, is used as the high-temperature system cooling liquid and the low-temperature system temperature-adjusting liquid, any other suitable temperature-adjusting liquid formed e.g. by oil may be used. Further, although in the second embodiment, the temperature-increasing valve 53 is used as an actuator for controlling the upstream-side or downstream-side low-temperature system coolant temperature TWUS or TWDS to the target temperature TWCMD, the electric pump 34 may be used in addition to the temperature-increasing valve 53. In this case, a valve capable of assuming only two states, i.e. a fully-open state and a fully-closed state may be used as the temperature-increasing valve 53. Furthermore, although in the second embodiment, the mechanical pump 43 is used as the main pump of the present invention, an electric pump may be used. In this case, in addition to the temperature-increasing valve 53, at least one of a main pump formed by the electric pump and the electric pump 34 may be used as an actuator for controlling the upstream-side or downstream-side low-temperature system coolant temperature TWUS or TWDS to the target temperature TWCMD.

Further, although in the second embodiment, a temperature-increasing device of a type which increases the temperature of the low-temperature system temperature-adjusting liquid by mixing the high-temperature system cooling liquid into the low-temperature system temperature-adjusting liquid, is used as the temperature-increasing device 50, any other suitable temperature-increasing device, for example, a heater provided in the IC temperature-adjusting liquid passages 33 or the like may be used. Furthermore, although in the second embodiment, the turbocharger 10 is a turbocharger, it may be replaced by a supercharger. Further, although in the second embodiment, the upstream-side low-temperature system coolant temperature TWUS and the downstream-side low-temperature system coolant temperature TWDS are detected by the upstream-side coolant to temperature sensor 80 and the downstream-side coolant temperature sensor 81, respectively, one of the upstream-side low-temperature system coolant temperature and the downstream-side low-temperature system coolant temperature may be detected by a sensor, and the other thereof may be calculated (estimated) using a result of the detection. In this case, higher calculation accuracy can be obtained by detecting the upstream-side low-temperature system coolant temperature by the sensor, and calculating the downstream-side low-temperature system coolant temperature using a result of the detection.

Furthermore, although in the second embodiment, the engine speed NE and the net average effective pressure BMEP are used for determinations in the steps 23, 25, and 27, only the net average effective pressure BMEP may be used, or any other suitable parameter representing load of the engine 3, for example, demanded torque of the engine 3 or boost pressure generated by the turbocharger 10 maybe used in instead of the net average effective pressure BMEP. Further, although in the second embodiment, an intake gas temperature parameter of the present invention is the outside air temperature TA, any other suitable parameter may be used. Furthermore, although in the second embodiment, the outside air temperature TA is used as a parameter for correcting the operating region map shown in FIG. 7, instead of this, or in combination with this, any other suitable parameter having effect on generation of condensed water in the intercooler 32, for example, the absolute humidity of intake gases or the like may be used.

Further, although in the second embodiment, the first control operation is performed when it is determined that the engine 3 is in the temperature-increasing operating region, and the second control operation is performed when it is determined that the engine 3 is in the cooling operating region, the temperature of intake gases flowing into the intercooler may be acquired (detected/estimated), whereby when the acquired temperature of intake gases is not higher than the target temperature TWCMD (or the dew-point temperature of intake gases), the first control operation may be performed, and when the acquired temperature of intake gases is higher than the target temperature TWCMD (or the dew-point temperature of intake gases), the second control operation may be performed. Furthermore, although in the second embodiment, the engine 3 is a gasoline engine, there may be used any of various industrial engines including a diesel engine, and engines for ship propulsion machines, such as an outboard motor having a vertically-disposed crankshaft. It is to be further understood that various changes and modifications may be made without departing from the spirit and scope of the invention.

INDUSTRIAL APPLICABILITY

As described heretofore, the control apparatus for an internal combustion engine of the present invention is effective in speeding up the start time of EGR control while preventing condensed water from being generated in intake air when the operating region of the engine has shifted from an EGR stop region to an EGR execution region in a case where the engine is provided with a supercharging device, an EGR device, and an intake air cooling device, and is effective in properly suppressing generation of condensed water in an intercooler.

REFERENCE SIGNS LIST 1 control apparatus
2 ECU (operating region-determining means, EGR control means, first coolant temperature control means, second coolant temperature control means, coolant temperature control-stopping means, target temperature-calculating means, control means, operating state-determining means)
3 internal combustion engine
3b engine body
4 intake passage
7 exhaust passage
10 turbocharger (supercharging device)
30 intake air cooling device (first cooling device), intake gas temperature-adjusting circuit 31 sub radiator (first radiator)
32 intercooler
33 IC temperature-adjusting liquid passage (sub passage)
34 electric pump (sub pump)
40 ENG cooling device (second cooling device), engine cooling circuit
41 main radiator (second radiator)
42 engine cooling liquid passage (main passage)
43 mechanical pump (main pump)
50 temperature-increasing device
51 coolant inflow passage (plurality of connecting passages)
52 coolant outflow passage (plurality of connecting passages)
53 temperature-increasing valve (valve)
60 EGR device
80 upstream-side coolant temperature sensor (upstream-side liquid temperature-acquiring means)
81 downstream-side coolant temperature sensor (downstream-side liquid temperature-acquiring means)
85 outside air temperature sensor (intake gas temperature parameter-acquiring means)
A EGR stop region, first stop region
B EGR execution region
C EGR stop region, second coolant temperature control execution region
D EGR stop region, second stop region
E first operating region
F second operating region
G third operating region
H fourth operating region
NE engine speed (value defining operating region)
BMEP net average effective pressure (value defining operating region)
TWic temperature of coolant in intake air cooling circuit (temperature of coolant in first cooling circuit)
TWUS upstream-side low-temperature system coolant temperature (upstream-side liquid temperature)
TWDS downstream-side low-temperature system coolant temperature (downstream-side liquid temperature)
TWCMD target temperature

The invention claimed is:

1. A control apparatus for an internal combustion engine that includes a turbocharger that pressurizes intake air in an intake passage, a an intercooler cooling intake air flowing through a predetermined portion of the intake passage at a location downstream of a compressor of the turbocharger, by using coolant circulating through a first radiator and a first cooling circuit, a coolant inflow passage connected to the first cooling circuit, a coolant outflow passage connected to the first cooling circuit, and a coolant regulating valve positioned in the coolant inflow passage for increasing a temperature of the coolant in the first cooling circuit, and an exhaust gas recirculation (EGR) line recirculating part of exhaust gases in an exhaust passage to an upstream side of the predetermined portion of the intake passage, the EGR line comprising a cooler and an EGR valve,
the control apparatus comprising non-transitory executable instructions to:
determine whether the internal combustion engine is operating in an EGR execution region where recirculation of exhaust gases occurs via the opening of the EGR valve in the EGR line or is operating in an EGR stop region where the recirculation of exhaust gases is stopped by the closure of the EGR valve in the EGR line;
regulate an amount of exhaust gases recirculated into the intake passage via the EGR valve, when the internal combustion engine is determined to be in the EGR execution region;
regulate the temperature of the coolant in the first cooling circuit by adjusting a position of the coolant regulating valve in the coolant inflow line to maintain a temperature of the intake air having passed through the predetermined portion of the intake passage above a dewpoint temperature when the internal combustion engine is determined to be in the EGR execution region; and
wherein the EGR stop region has a first region and a second region,
wherein in the first region of the EGR stop region, the control apparatus regulates the temperature of the coolant in the first cooling circuit by adjusting the position of the coolant regulating valve in the coolant inflow line to maintain the temperature of the intake air having passed through the predetermined portion of the intake passage above the dewpoint temperature when the internal combustion engine is determined to be in the EGR stop region;
wherein in the second region of the EGR stop region, the control apparatus fully closes the coolant regulating valve positioned in the coolant inflow line.

2. The control apparatus according to claim 1, wherein the internal combustion engine further includes a second radiator in a second cooling circuit which cools an engine body by circulating coolant through the second radiator in the second cooling circuit, and
wherein the temperature-increasing device is configured to increase the temperature of the coolant in the first cooling circuit by introducing the coolant in the second cooling device into the first cooling circuit of the first cooling device.

3. The control apparatus according to claim 1, wherein
the first region of the EGR stop region further includes a first stop region having a lower engine load than an engine load when the internal combustion engine is in EGR execution region, a second stop region having a higher engine load than the engine load when the internal combustion engine is in EGR execution region, a third stop region where an engine speed is higher than the engine speed in the EGR execution region,
the second region further includes a fourth stop region having a lower engine load than the engine load of the first stop region of the first region and having a lower engine speed than the engine speed of the third stop region of the first region, and
a fifth stop region having a higher engine load than the engine load of the second stop region of the first region and having a higher engine speed than the engine speed in the third stop region of the first region.

4. The control apparatus according to claim 2,
the first region of the EGR stop region further includes a first stop region having a lower engine load than an engine load when the internal combustion engine is in EGR execution region, a second stop region having a higher engine load than the engine load when the internal combustion engine is EGR execution region, a third stop region where an engine speed is higher than the engine speed in the EGR execution region,
the second region further includes a fourth stop region having a lower engine load than the engine load of the first stop region of the first region and having a lower engine speed than the engine speed of the third stop region of the first region, and a fifth stop region having a higher engine load than the engine load of the second stop region of the first region and having a higher engine speed than the engine speed in the third stop region of the first region.

* * * * *